(12) United States Patent
Zeng

(10) Patent No.: US 12,199,793 B2
(45) Date of Patent: Jan. 14, 2025

(54) CONTROLLER AREA NETWORK BUS NETWORK ACCESS UNIT AND RELATED NETWORK, METHOD, APPARATUS

(71) Applicant: ALIBABA GROUP HOLDING LIMITED, Grand Cayman (KY)

(72) Inventor: Can Zeng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 222 days.

(21) Appl. No.: 17/932,216

(22) Filed: Sep. 14, 2022

(65) Prior Publication Data

US 2023/0013966 A1   Jan. 19, 2023

Related U.S. Application Data

(63) Continuation of application No. PCT/CN2021/079670, filed on Mar. 9, 2021.

(30) Foreign Application Priority Data

Mar. 16, 2020 (CN) .......................... 202010182567.0

(51) Int. Cl.
   *G06F 15/173* (2006.01)
   *H04L 12/40* (2006.01)
(52) U.S. Cl.
   CPC .................. *H04L 12/40169* (2013.01); *H04L 2012/40215* (2013.01)
(58) Field of Classification Search
   CPC ............................................ H04L 2012/40215
   See application file for complete search history.

(56) References Cited

U.S. PATENT DOCUMENTS

| 9,881,165 B2 | 1/2018 | Litichever et al. |
| 2006/0193095 A1 | 8/2006 | Hunter et al. |
| (Continued) | | |

FOREIGN PATENT DOCUMENTS

| CN | 101360036 A | 2/2009 |
| CN | 102055633 A | 5/2011 |
| (Continued) | | |

OTHER PUBLICATIONS

Supplemental Search Report issued in corresponding Chinese Application No. 202010182567.0 on Feb. 17, 2022 (2 pages).
(Continued)

*Primary Examiner* — Joseph R Maniwang
(74) *Attorney, Agent, or Firm* — Finnegan, Henderson, Farabow, Garrett & Dunner, LLP

(57) ABSTRACT

The present disclosure provides a controller area network (CAN) bus network access unit, a related network, a method, and an apparatus. The CAN bus network access unit includes: a first CAN bus; a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a plurality of variable connection ports, where each variable connection port is communicatively coupled to one of the first CAN bus and the second CAN bus, or communicatively coupled to neither the first CAN bus nor the second CAN bus. In embodiments of the present disclosure, an electric control part used in a conveying line is standardized. A time-delay is reduced and costs of network wiring and device management are reduced.

20 Claims, 12 Drawing Sheets

(56) References Cited

U.S. PATENT DOCUMENTS

2018/0062547 A1    3/2018   Dutta et al.
2018/0351765 A1    12/2018  Aarey Premanath et al.

FOREIGN PATENT DOCUMENTS

| | | |
|---|---|---|
| CN | 102904786 A | 1/2013 |
| CN | 102957587 A | 3/2013 |
| CN | 203133584 U | 8/2013 |
| CN | 205792658 U | 12/2016 |
| CN | 106375010 A | 2/2017 |
| CN | 106740585 A | 5/2017 |
| CN | 106850368 A | 6/2017 |
| CN | 206528429 U | 9/2017 |
| CN | 108075954 A | 5/2018 |
| CN | 207612428 U | 7/2018 |
| WO | WO2019162891 A1 | 8/2019 |

OTHER PUBLICATIONS

First Search Report issued in corresponding Chinese Application No. 202010182567.0 on Jul. 15, 2022 (1 page).

PCT International Search Report and Written Opinion mailed May 28, 2021, issued in corresponding International Application No. PCT/CN2021/079670 (11 pgs.).

European Patent Office Communication issued for Application No. 21770512.8 the Supplementary European Search Report (Art. 153(7) EPC) and the European search opinion dated Sep. 8, 2023, 8 pages.

CONTROLLER AREA NETWORK BUS NETWORK ACCESS UNIT AND RELATED NETWORK, METHOD, APPARATUS

CROSS-REFERENCE TO RELATED APPLICATIONS

The disclosure claims the benefits of priority to PCT Application No. PCT/CN2021/079670, filed on Mar. 9, 2021, which claims the benefits of priority to Chinese Patent Application No. 202010182567.0, filed on Mar. 16, 2020, both of which are incorporated herein by reference in their entireties.

TECHNICAL FIELD

The present disclosure relates to the field of automatic control, and more specifically, to a controller area network (CAN) bus network access unit and a related network, a related method, a related apparatus.

BACKGROUND

A conveying line product is generally used for back-end logistics sorting and outbound delivery of modern logistics merchants. A conveying line is an aggregation of all conveying devices for completing article conveying, such as a conveying belt and a conveyor. A site surrounding a warehouse, a production workshop, and a packaging workshop is provided with conveying chains that are formed by many belt conveyors, roller conveyors, and the like. These conveying chains are connected end to end to form a continuous conveying line. Because the conveying line not only requires a physical device used for actual conveying, but also requires an electric control signal for controlling conveying of the conveying line, control components and a control bus are further required in the conveying line. The control components are distributed to parts of the conveying line, and interaction of the electric control signal is performed through the uniform control bus.

Because the conveying line includes many devices, and various line connections of the control components and the control bus are complex, an on-site engineer needs to perform a large quantity of debugging on signal point positions and collaboration relationships. In addition, actual site forms of all stores have a tremendous difference. As a result, the construction process cannot be standardized, and the debugging process is very long. In the existing technology, the 485 serial port communication technology or the RJ45 Ethernet technology is mainly adopted to standardize the electric control part in a conveying line. The time delay of the 485 serial port communication is relatively large. The time delay is controlled in the RJ45 Ethernet. However, because each device is connected to a same network switch device, the network wiring and device management costs are relatively high. Currently, there is a lack of a technology that can standardize the electric control part used in the conveying line and give consideration to both the time delay and costs of the network wiring and device management.

SUMMARY OF THE DISCLOSURE

In view of this, the present disclosure aims to provide a technology for standardizing an electric control part used in a conveying line, to reduce a time delay and costs of network wiring and device management.

According to some embodiments of the present disclosure, a CAN bus network access unit is provided, including: a first CAN bus; a second CAN bus; a first CAN bus transceiver; a second CAN bus transceiver, wherein the first CAN bus transceiver and the second CAN bus transceiver are respectively communicatively coupled to the first CAN bus and the second CAN bus and are respectively configured to communicate with another first CAN bus and another second CAN bus in another CAN bus network access unit; a first port, communicatively coupled to the first CAN bus; and a plurality of variable connection ports, wherein at least one of the plurality of variable connection ports is communicatively coupled to one of the first CAN bus and the second CAN bus, or communicatively coupled to neither the first CAN bus nor the second CAN bus.

Optionally, the plurality of variable connection ports comprise a second port, a third port, and a fourth port.

Optionally, the third port is communicatively coupled to the second CAN bus, and any one of the second port and the fourth port is communicatively coupled to neither the first CAN bus nor the second CAN bus.

Optionally, the CAN bus network access unit is a CAN bus network access unit located in only the CAN, and none of the second port, the third port, and the fourth port is communicatively coupled to the second CAN bus.

Optionally, the CAN bus network access unit is a CAN bus network access unit not only located in the CAN, but also located in another CAN, and at least one of the second port, the third port, and the fourth port is communicatively coupled to the second CAN bus.

Optionally, the CAN bus network access unit is a CAN bus network access unit of an electric control network in a logistics conveying line, and at least one of the first port and the plurality of variable connection ports is communicatively coupled to a control component configured to control logistics conveying in the logistics conveying line.

Optionally, the CAN bus network access unit is a CAN bus network access unit of an electric control network in a product production line, and at least one of the first port and the plurality of variable connection ports is communicatively coupled to a control component configured to control product production in the product production line.

Optionally, the CAN bus network access unit is a CAN bus network access unit of an Internet of Things, and at least one of the first port and the plurality of variable connection ports is communicatively coupled to an Internet of Things device accessing the Internet of Things.

According to some embodiments of the present disclosure, an electric control network is provided, including a first controller area network (CAN) and a second CAN, wherein the first CAN and the second CAN has a common routing CAN bus network access unit, and at least one of the first CAN and the second CAN further has an internal CAN bus network access unit in addition to the routing CAN bus network access unit, wherein each of the routing CAN bus network access unit and the internal CAN bus network access unit comprises a first CAN bus, a second CAN bus, a first port, a second port, a third port, and a fourth port, wherein in the internal CAN bus network access unit, the first port is communicatively coupled to the first CAN bus, and none of the second port, the third port, and the fourth port is communicatively coupled to the second CAN bus; and in the routing CAN bus network access unit, the first port is communicatively coupled to the first CAN bus, and at least one of the second port, the third port, and the fourth port is communicatively coupled to the second CAN bus.

Optionally, the routing CAN bus network access unit or the internal CAN bus network access unit further comprises: a first CAN bus transceiver and a second CAN bus transceiver, respectively communicatively coupled to the first CAN bus and the second CAN bus and respectively configured to communicate with another first CAN bus and another second CAN bus in another CAN bus network access unit.

Optionally, the internal CAN bus network access unit of the first CAN comprises a message sending CAN bus network access unit and a message receiving CAN bus network access unit, wherein the first CAN bus transceiver of the message sending CAN bus network access unit is configured to broadcast a directing message to another CAN bus network access unit in the first CAN, and the directing message contains an identifier of the message receiving CAN bus network access unit; the message receiving CAN bus network access unit is configured to, after receiving the directing message, determine that the identifier of the message receiving CAN bus network access unit contained in the directing message matches its own identifier, and to reserve the directing message; and another internal CAN bus network access unit other than the message receiving CAN bus network access unit is configured to, after receiving the directing message, determine that the identifier of the message receiving CAN bus network access unit contained in the directing message does not match its own identifier, and to discard the directing message; and the routing CAN bus network access unit is configured to, after receiving the directing message, determine that the identifier of the message receiving CAN bus network access unit contained in the directing message is in a first CAN bus network access unit identifier list, and to discard the directing message.

Optionally, the internal CAN bus network access unit of the first CAN comprises a message sending CAN bus network access unit, and the internal CAN bus network access unit of the second CAN comprises a message receiving CAN bus network access unit, wherein the first CAN bus transceiver of the message sending CAN bus network access unit is configured to broadcast a directing message to another CAN bus network access unit in the first CAN, and the directing message contains an identifier of the message receiving CAN bus network access unit; another internal CAN bus network access unit is configured to, after receiving the directing message, determine that the identifier of the message receiving CAN bus network access unit contained in the directing message does not match its own identifier, and to discard the directing message; the routing CAN bus network access unit is configured to, after receiving the directing message, determine that the identifier of the message receiving CAN bus network access unit contained in the directing message is not in a first CAN bus network access unit identifier list, and to broadcast the directing message to the internal CAN bus network access unit in the second CAN through the second CAN bus transceiver; and the message receiving CAN bus network access unit in the second CAN is configured to, after receiving the directing message, determine that the identifier of the message receiving CAN bus network access unit contained in the directing message matches its own identifier, and to reserve the directing message; and another internal CAN bus network access unit other than the message receiving CAN bus network access unit in the second CAN is configured to after receiving the directing message, determine that the identifier of the message receiving CAN bus network access unit contained in the directing message does not match its own identifier, and to discard the directing message.

Optionally, the electric control network is an electric control network in a logistics conveying line, and at least one of the first port and the plurality of variable connection ports is communicatively coupled to a control component configured to control logistics conveying in the logistics conveying line.

Optionally, the electric control network is an electric control network in a product production line, and at least one of the first port and the plurality of variable connection ports is communicatively coupled to a control component configured to control product production in the product production line.

Optionally, the electric control network is an Internet of Things, and at least one of the first port and the plurality of variable connection ports is communicatively coupled to an Internet of Things device accessing the Internet of Things.

According to some embodiments of the present disclosure, a directing message processing method in an electric control network is provided, wherein the electric control network is formed by a plurality of controller area networks (CANs) connected in series, wherein two neighboring CANs of the plurality of CANs connected in series have a common routing CAN bus network access unit, at least one of the plurality of CANs further has an internal CAN bus network access unit in addition to the routing CAN bus network access unit, the method is performed by a current CAN bus network access unit receiving a directing message in the electric control network, the directing message comprises an identifier of a message receiving CAN bus network access unit, and the method comprises: determining whether the current CAN bus network access unit is the internal CAN bus network access unit or the routing CAN bus network access unit; determining, if the current CAN bus network access unit is the internal CAN bus network access unit, whether the identifier of the message receiving CAN bus network access unit contained in the directing message matches its own identifier, if the identifier of the message receiving CAN bus network access unit contained in the directing message matches its own identifier, reserving the directing message; or if the identifier of the message receiving CAN bus network access unit contained in the directing message does not match its own identifier, discarding the directing message; and determining, if the current CAN bus network access unit is the routing CAN bus network access unit, whether the identifier of the message receiving CAN bus network access unit contained in the directing message is in a CAN bus network access unit identifier list of a CAN upstream from the routing CAN bus network access unit, if the identifier of the message receiving CAN bus network access unit contained in the directing message is in the CAN bus network access unit identifier list of a CAN upstream from the routing CAN bus network access unit, discarding the directing message; and if the identifier of the message receiving CAN bus network access unit contained in the directing message is not in the CAN bus network access unit identifier list of a CAN upstream from the routing CAN bus network access unit, broadcasting the directing message to a CAN bus network access unit downstream from the routing CAN bus network access unit if not.

According to some embodiments of the present disclosure, a status notification method for a CAN bus network access unit is provided, wherein the CAN bus network access unit comprises: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port; the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the method comprises: determining whether the CAN bus network access unit is the straight-line CAN bus network access unit or the transplanter CAN bus network access unit; if the CAN bus network access unit is the straight-line CAN bus network access unit, connecting the first port to the first CAN bus and the third port to the second CAN bus in a first scanning period, a second scanning period, a third scanning period, and a fourth scanning period that are consecutive; if the CAN bus network access unit is the transplanter CAN bus network access unit: connecting the first port to the first CAN bus and the second port, the third port, and the fourth port to the second CAN bus in the first scanning period; connecting the first port, the third port, and the fourth port to the first CAN bus and the second port to the second CAN bus in the second scanning period; connecting the first port, the second port, and the fourth port to the first CAN bus and the third port to the second CAN bus in the third scanning period; and connecting the first port, the second port, and the third port to the first CAN bus and the fourth port to the second CAN bus in the fourth scanning period; and sending messages by using the first CAN bus transceiver and the second CAN bus transceiver and notifying, through ports communicatively coupled to the first CAN bus transceiver and the second CAN bus transceiver, an identifier of the CAN bus network access unit, a bus number corresponding to the transceivers, and a port number of a port communicatively coupled to the bus.

Optionally, before the connecting the first port to the first CAN bus and connecting the third port to the second CAN bus in the first scanning period, the second scanning period, the third scanning period, and the fourth scanning period that are consecutive, the method further comprises: connecting the first port to the first CAN bus and connecting the third port to the second CAN bus in a first silent period before the first scanning period; and after the connecting the first port to the first CAN bus and connecting the third port to the second CAN bus in the first scanning period, the second scanning period, the third scanning period, and the fourth scanning period that are consecutive, the method further comprises: connecting the first port to the first CAN bus and connecting the third port to the second CAN bus in a second silent period before the fourth scanning period.

Optionally, before the connecting the first port to the first CAN bus and connecting the second port, the third port, and the fourth port to the second CAN bus in the first scanning period, the method further comprises: connecting the first port to the first CAN bus and connecting the second port, the third port, and the fourth port to the second CAN bus in a first silent period before the first scanning period; and after the connecting the first port, the second port, and the third port to the first CAN bus and connecting the fourth port to the second CAN bus in the fourth scanning period, the method further comprises: connecting the first port, the second port, and the third port to the first CAN bus and connecting the fourth port to the second CAN bus in a second silent period after the fourth scanning period.

Optionally, before the determining whether the CAN bus network access unit is the straight-line CAN bus network access unit or the transplanter CAN bus network access unit, the method further comprises: receiving a CAN control message in a scanning starting subtype sent by a detection starting CAN bus network access unit.

Optionally, the CAN control message in the scanning starting subtype is broadcasted by the detection starting CAN bus network access unit in a CAN in which the detection starting CAN bus network access unit is located; and is broadcasted by a routing CAN bus network access unit between the CAN and another CAN to a CAN bus network access unit in the another CAN.

Optionally, the sending messages by using the first CAN bus transceiver and the second CAN bus transceiver and notifying, through ports communicatively coupled to the first CAN bus transceiver and the second CAN bus transceiver, the identifier of the CAN bus network access unit, the bus number corresponding to the transceivers, and the port number of the port communicatively coupled to the bus comprises: for the straight-line CAN bus network access unit, sending a message by using the first CAN bus transceiver and notifying, through the first port communicatively coupled to the first CAN bus transceiver, the identifier of the CAN bus network access unit, a bus number 1, and a port number 1; and sending a message by using the second CAN bus transceiver and notifying, through the third port communicatively coupled to the second CAN bus transceiver, the identifier of the CAN bus network access unit, a bus number 2, and a port number 3; and for the transplanter CAN bus network access unit, sending a message by using the first CAN bus transceiver, notifying, through a port communicatively coupled to the first CAN bus transceiver, the identifier of the CAN bus network access unit, a bus number 1, and a particular flag bit, and responding, in response to receiving a port query request, with a port number the first CAN bus communicatively coupled to; and sending a message by using the second CAN bus transceiver, notifying, through a port communicatively coupled to the second CAN bus transceiver, the identifier of the CAN bus network access unit, a bus number 2, and a particular flag bit, and responding, in response to receiving a port query request, with a port number of a port communicatively coupled to the second CAN bus.

According to some embodiments of the present disclosure, a connection status detection method for a CAN bus network access unit is provided, wherein the CAN bus network access unit comprises: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port; the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the method comprises: determining, for a to-be-detected port of the CAN bus network access unit if the to-be-detected port receives, in a first scanning period, a second scanning period, a third scanning period, and a fourth scanning period that are consecutive, a message notifying an identifier of the CAN bus network access unit, a bus number 1, and a port number 1, that the to-be-detected port is communicatively coupled to a straight-line CAN bus network access unit, and recording the identifier of the CAN bus network access unit, wherein the to-be-detected port is communicatively coupled to a first port of the straight-line CAN bus network access unit, and the first port is a logical entry; determining, if the to-be-detected port receives, in the first scanning period, the second scanning period, the third scanning period, and the fourth scanning period that are consecutive, a message notifying a notification of the identifier of the CAN bus network access unit, a bus number 2, and a port number 3, that the to-be-detected port is communicatively coupled to a straight-line CAN bus network access unit, and recording the identifier of the CAN bus network access unit, wherein the to-be-detected port is communicatively coupled to a third port of the straight-line CAN bus network access unit, and the third port is a logical exit; determining, if the to-be-detected port receives, in the first scanning period, a message notifying the identifier of the CAN bus network access unit, a bus number 1, and a particular flag bit, that the to-be-detected port is communicatively coupled to a transplanter CAN bus network access unit, and recording the identifier of the CAN bus network access unit, wherein the to-be-detected port is communicatively coupled to a first port of the transplanter CAN bus network access unit, and the first port is a logical entry; recording, if the to-be-detected port receives, in the second scanning period, a message notifying the identifier of the CAN bus network access unit, a bus number 1 or 2, and a particular flag bit, and receives a port number 2 after sending a port query request, the identifier of the CAN bus network access unit, wherein the to-be-detected port is communicatively coupled to a second port of the transplanter CAN bus network access unit, and in a case of the bus number 1, the second port is a logical exit; and in a case of the bus number 2, the second port is a logical entry; recording, if the to-be-detected port receives, in the third scanning period, a message notifying the identifier of the CAN bus network access unit, a bus number 1 or 2, and a particular flag bit, and receives a port number 3 after sending a port query request, the identifier of the CAN bus network access unit, wherein the to-be-detected port is communicatively coupled to a third port of the transplanter CAN bus network access unit, and in a case of the bus number 1, the third port is a logical exit; and in a case of the bus number 2, the third port is a logical entry; and recording, if the to-be-detected port receives, in the fourth scanning period, a message notifying the identifier of the CAN bus network access unit, a bus number 1 or 2, and a particular flag bit, and receives a port number 4 after sending a port query request, the identifier of the CAN bus network access unit, wherein the to-be-detected port is communicatively coupled to a fourth port of the transplanter CAN bus network access unit, and in a case of the bus number 1, the fourth port is a logical exit; and in a case of the bus number 2, the fourth port is a logical entry.

Optionally, after the step of recording, if the to-be-detected port receives, in the fourth scanning period, a message notifying the identifier of the CAN bus network access unit, the bus number 1 or 2, and the particular flag bit, and receives a port number 4 after sending a port query request, the identifier of the CAN bus network access unit, wherein the to-be-detected port is communicatively coupled to a fourth port of the straight-line CAN bus network access unit, and in a case of the bus number 1, the fourth port is a logical exit; and in a case of the bus number 2, the fourth port is a logical entry, the method further comprises: generating, for each to-be-detected port of each CAN bus network access unit in an electric control network, a port connection diagram of the electric control network according to a recorded identifier of the connected CAN bus network access unit, a port number of the communicatively coupled CAN bus network access unit, and whether the communicatively coupled port is a logical entry or a logical exit.

According to some embodiments of the present disclosure, a status notification apparatus for a CAN bus network access unit is provided, wherein the CAN bus network access unit comprises: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port; the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the status notification apparatus comprises: a type determining module, configured to determine whether the CAN bus network access unit is the straight-line CAN bus network access unit or the transplanter CAN bus network access unit; a first connection setting module, configured to connect, if the CAN bus network access unit is the straight-line CAN bus network access unit, the first port to the first CAN bus and the third port to the second CAN bus in a first scanning period, a second scanning period, a third scanning period, and a fourth scanning period that are consecutive; a second connection setting module, configured to connect, if the CAN bus network access unit is the transplanter CAN bus network access unit, the first port to the first CAN bus and the second port, the third port, and the fourth port to the second CAN bus in the first scanning period; to connect the first port, the third port, and the fourth port to the first CAN bus and the second port to the second CAN bus in the second scanning period; to connect the first port, the second port, and the fourth port to the first CAN bus and the third port to the second CAN bus in the third scanning period; and to connect the first port, the second port, and the third port to the first CAN bus and the fourth port to the second CAN bus in the fourth scanning period; and a status notification module, configured to send messages by using the first CAN bus transceiver and the second CAN bus transceiver and notify, through ports communicatively coupled to the first CAN bus transceiver and the second CAN bus transceiver, an identifier of the CAN bus network access unit, a bus number corresponding to the transceivers, and a port number of a port communicatively coupled to the bus.

According to some embodiments of the present disclosure, a connection status detection apparatus for a CAN bus network access unit is provided, wherein the CAN bus network access unit comprises: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port;

the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the connection status detection apparatus comprises:

a first record module, configured to determine, for a to-be-detected port of the CAN bus network access unit if the to-be-detected port receives, in a first scanning period, a second scanning period, a third scanning period, and a fourth scanning period that are consecutive, a message notifying an identifier of the CAN bus network access unit, a bus number 1, and a port number 1, that the to-be-detected port is communicatively coupled to a straight-line CAN bus network access unit, and record the identifier of the CAN bus network access unit, wherein the to-be-detected port is communicatively coupled to a first port of the straight-line CAN bus network access unit, and the first port is a logical entry;

a second record module, configured to determine, if the to-be-detected port receives, in the first scanning period, the second scanning period, the third scanning period, and the fourth scanning period that are consecutive, a message notifying the identifier of the CAN bus network access unit, a bus number 2, and a port number 3, that the to-be-detected port is communicatively coupled to a straight-line CAN bus network access unit, and record the identifier of the CAN bus network access unit, wherein the to-be-detected port is communicatively coupled to a third port of the straight-line CAN bus network access unit, and the third port is a logical exit;

a third record module, configured to determine, if the to-be-detected port receives, in the first scanning period, a message notifying the identifier of the CAN bus network access unit, the bus number 1, and a particular flag bit, that the to-be-detected port is communicatively coupled to a transplanter CAN bus network access unit, and record the identifier of the CAN bus network access unit, wherein the to-be-detected port is communicatively coupled to a first port of the transplanter CAN bus network access unit, and the first port is a logical entry;

a fourth record module, configured to record, if the to-be-detected port receives, in the second scanning period, a message notifying the identifier of the CAN bus network access unit, the bus number 1 or 2, and a particular flag bit, and receives a port number 2 after sending a port query request, the identifier of the CAN bus network access unit, wherein the to-be-detected port is communicatively coupled to a second port of the transplanter CAN bus network access unit, and in a case of the bus number 1, the second port is a logical exit; and in a case of the bus number 2, the second port is a logical entry;

a fifth record module, configured to record, if the to-be-detected port receives, in the third scanning period, a message notifying the identifier of the CAN bus network access unit, the bus number 1 or 2, and a particular flag bit, and receives a port number 3 after sending a port query request, the identifier of the CAN bus network access unit, wherein the to-be-detected port is communicatively coupled to a third port of the transplanter CAN bus network access unit, and in a case of the bus number 1, the third port is a logical exit; and in a case of the bus number 2, the third port is a logical entry; and a sixth record module, configured to record, if the to-be-detected port receives, in the fourth scanning period, a message notifying the identifier of the CAN bus network access unit, the bus number 1 or 2, and a particular flag bit, and receives a port number 4 after sending a port query request, the identifier of the CAN bus network access unit, wherein the to-be-detected port is communicatively coupled to a fourth port of the transplanter CAN bus network access unit, and in a case of the bus number 1, the fourth port is a logical exit; and in a case of the bus number 2, the fourth port is a logical entry.

According to some embodiments of the present disclosure, a CAN bus network access unit is provided, including: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; a second port, a third port, and a fourth port; a memory; and a processing logic, wherein the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus;

the memory is configured to store control instructions; and the processing logic is configured to read the control instructions stored in the memory to cause the CAN bus network access unit to perform:

determining whether the CAN bus network access unit is the straight-line CAN bus network access unit or the transplanter CAN bus network access unit;

if the CAN bus network access unit is the straight-line CAN bus network access unit, connecting the first port to the first CAN bus and the third port to the second CAN bus in a first scanning period, a second scanning period, a third scanning period, and a fourth scanning period that are consecutive;

if the CAN bus network access unit is the transplanter CAN bus network access unit, connecting the first port to the first CAN bus and the second port, the third port, and the fourth port to the second CAN bus in the first scanning period; connecting the first port, the third port, and the fourth port to the first CAN bus and the second port to the second CAN bus in the second scanning period; connecting the first port, the second port, and the fourth port to the first CAN bus and the third port to the second CAN bus in the third scanning period; and connecting the first port, the second port, and the third port to the first CAN bus and the fourth port to the second CAN bus in the fourth scanning period; and sending messages by using the first CAN bus transceiver and the second CAN bus transceiver and notifying, through ports communicatively coupled to the first CAN bus transceiver and the second CAN bus transceiver, an identifier of the CAN bus network access unit, numbers of the buses corresponding to the transceivers, and numbers of the ports communicatively coupled to the buses.

According to some embodiments of the present disclosure, a CAN bus network access unit is provided, including: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; a second port, a third port, and a fourth port; a memory; and a processing logic, wherein the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus;

the memory is configured to store control instructions; and the processing logic is configured to read the control instructions stored in the memory to cause the CAN bus network access unit to perform:

determining, for a to-be-detected port of the CAN bus network access unit if the to-be-detected port receives, in a first scanning period, a second scanning period, a third scanning period, and a fourth scanning period that are consecutive, a message notifying an identifier of the CAN bus network access unit, a bus number 1, and a port number 1, that the to-be-detected port is communicatively coupled to a straight-line CAN bus network access unit, and recording the identifier of the CAN bus network access unit, wherein the to-be-detected port is communicatively coupled to a first port of the straight-line CAN bus network access unit, and the first port is a logical entry;

determining, if the to-be-detected port receives, in the first scanning period, the second scanning period, the third scanning period, and the fourth scanning period that are consecutive, a message notifying the identifier of the CAN bus network access unit, a bus number 2, and a port number 3, that the to-be-detected port is connected to a straight-line CAN bus network access unit, and recording the identifier of the CAN bus network access unit, wherein the to-be-detected port is communicatively coupled to a third port of the straight-line CAN bus network access unit, and the third port is a logical exit;

determining, if the to-be-detected port receives, in the first scanning period, a message notifying the identifier of the CAN bus network access unit, the bus number 1, and a particular flag bit, that the to-be-detected port is communicatively coupled to a transplanter CAN bus network access unit, and recording the identifier of the CAN bus network access unit, wherein the to-be-detected port is communicatively coupled to a first port of the straight-line CAN bus network access unit, and the first port is a logical entry;

recording, if the to-be-detected port receives, in the second scanning period, a message notifying the identifier of the CAN bus network access unit, a bus number 1 or 2, and a particular flag bit, and receives a port number 2 after sending a port query request, the identifier of the CAN bus network access unit, wherein the to-be-detected port is communicatively coupled to a second port of the straight-line CAN bus network access unit, and in a case of the bus number 1, the second port is a logical exit; and in a case of the bus number 2, the second port is a logical entry;

recording, if the to-be-detected port receives, in the third scanning period, a message notifying the identifier of the CAN bus network access unit, the bus number 1 or 2, and a particular flag bit, and receives a port number 3 after sending a port query request, the identifier of the CAN bus network access unit, wherein the to-be-detected port is communicatively coupled to a third port of the straight-line CAN bus network access unit, and in a case of the bus number 1, the third port is a logical exit; and in a case of the bus number 2, the third port is a logical entry; and recording, if the to-be-detected port receives, in the fourth scanning period, a message notifying the identifier of the CAN bus network access unit, a bus number 1 or 2, and a particular flag bit, and receives a port number 4 after sending a port query request, the identifier of the CAN bus network access unit, wherein the to-be-detected port is communicatively coupled to a fourth port of the straight-line CAN bus network access unit, and in a case of the bus number 1, the fourth port is a logical exit; and in a case of the bus number 2, the fourth port is a logical entry.

According to some embodiments of the present disclosure, a computer-readable medium is provided, storing control instructions, configured to be executed by a processing logic of a CAN bus network access unit, where in addition to the processing logic, the CAN bus network access unit further includes: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port;

the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the control instructions are executed by the processing logic of the CAN bus network access unit, to cause the CAN bus network access unit to perform:

determining whether the CAN bus network access unit is the straight-line CAN bus network access unit or the transplanter CAN bus network access unit;

if the CAN bus network access unit is the straight-line CAN bus network access unit, connecting the first port to the first CAN bus and the third port to the second CAN bus in a first scanning period, a second scanning period, a third scanning period, and a fourth scanning period that are consecutive;

if the CAN bus network access unit is the transplanter CAN bus network access unit, connecting the first port to the first CAN bus and the second port, the third port, and the fourth port to the second CAN bus in the first scanning period; connecting the first port, the third port, and the fourth port to the first CAN bus and the second port to the second CAN bus in the second scanning period; connecting the first port, the second port, and the fourth port to the first CAN bus and the third port to the second CAN bus in the third scanning period; and connecting the first port, the second port, and the third port to the first CAN bus and the fourth port to the second CAN bus in the fourth scanning period; and sending messages by using the first CAN bus transceiver and the second CAN bus transceiver and notifying, through ports communicatively coupled to the first CAN bus transceiver and the second CAN bus transceiver, an identifier of the CAN bus network access unit, a bus number corresponding to the transceivers, and a port number of a port communicatively coupled to the bus.

According to some embodiments of the present disclosure, a computer-readable medium is provided, storing control instructions, configured to be executed by a processing logic of a CAN bus network access unit, where in addition to the processing logic, the CAN bus network access unit further includes a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port;

the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and the control instructions are executed by the processing logic of the CAN bus network access unit, to cause the CAN bus network access unit to perform:

determining, for a to-be-detected port of the CAN bus network access unit if the to-be-detected port receives, in a first scanning period, a second scanning period, a third scanning period, and a fourth scanning period that are consecutive, a message notifying an identifier of the CAN bus network access unit, a bus number 1, and a port number 1, that the to-be-detected port is communicatively coupled to a straight-line CAN bus network access unit, and recording the identifier of the CAN bus network access unit, wherein the to-be-detected port is communicatively coupled to a first port of the straight-line CAN bus network access unit, and the first port is a logical entry;

determining, if the to-be-detected port receives, in the first scanning period, the second scanning period, the third scanning period, and the fourth scanning period that are consecutive, a message notifying the identifier of the CAN bus network access unit, a bus number 2, and a port number 3, that the to-be-detected port is communicatively coupled to a straight-line CAN bus network access unit, and recording the identifier of the CAN bus network access unit, wherein the to-be-detected port is communicatively coupled to a third port of the straight-line CAN bus network access unit, and the third port is a logical exit;

determining, if the to-be-detected port receives, in the first scanning period, a message notifying the identifier of the CAN bus network access unit, the bus number 1, and a particular flag bit, that the to-be-detected port is communicatively coupled to a transplanter CAN bus network access unit, and recording the identifier of the CAN bus network access unit, wherein the to-be-detected port is communicatively coupled to a first port of the straight-line CAN bus network access unit, and the first port is a logical entry;

recording, if the to-be-detected port receives, in the second scanning period, a message notifying the identifier of the CAN bus network access unit, the bus number 1 or 2, and a particular flag bit, and receives a port number 2 after sending a port query request, the identifier of the CAN bus network access unit, wherein the to-be-detected port is communicatively coupled to a second port of the straight-line CAN bus network access unit, and in a case of the bus number 1, the second port is a logical exit; and in a case of the bus number 2, the second port is a logical entry;

recording, if the to-be-detected port receives, in the third scanning period, a message notifying the identifier of the CAN bus network access unit, the bus number 1 or 2, and a particular flag bit, and receives a port number 3 after sending a port query request, the identifier of the CAN bus network access unit, wherein the to-be-detected port is communicatively coupled to a third port of the straight-line CAN bus network access unit, and in a case of the bus number 1, the third port is a logical exit; and in a case of the bus number 2, the third port is a logical entry; and recording, if the to-be-detected port receives, in the fourth scanning period, a message notifying the identifier of the CAN bus network access unit, the bus number 1 or 2, and a particular flag bit, and receives a port number 4 after sending a port query request, the identifier of the CAN bus network access unit, wherein the to-be-detected port is communicatively coupled to a fourth port of the straight-line CAN bus network access unit, and in a case of the bus number 1, the fourth port is a logical exit; and in a case of the bus number 2, the fourth port is a logical entry.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
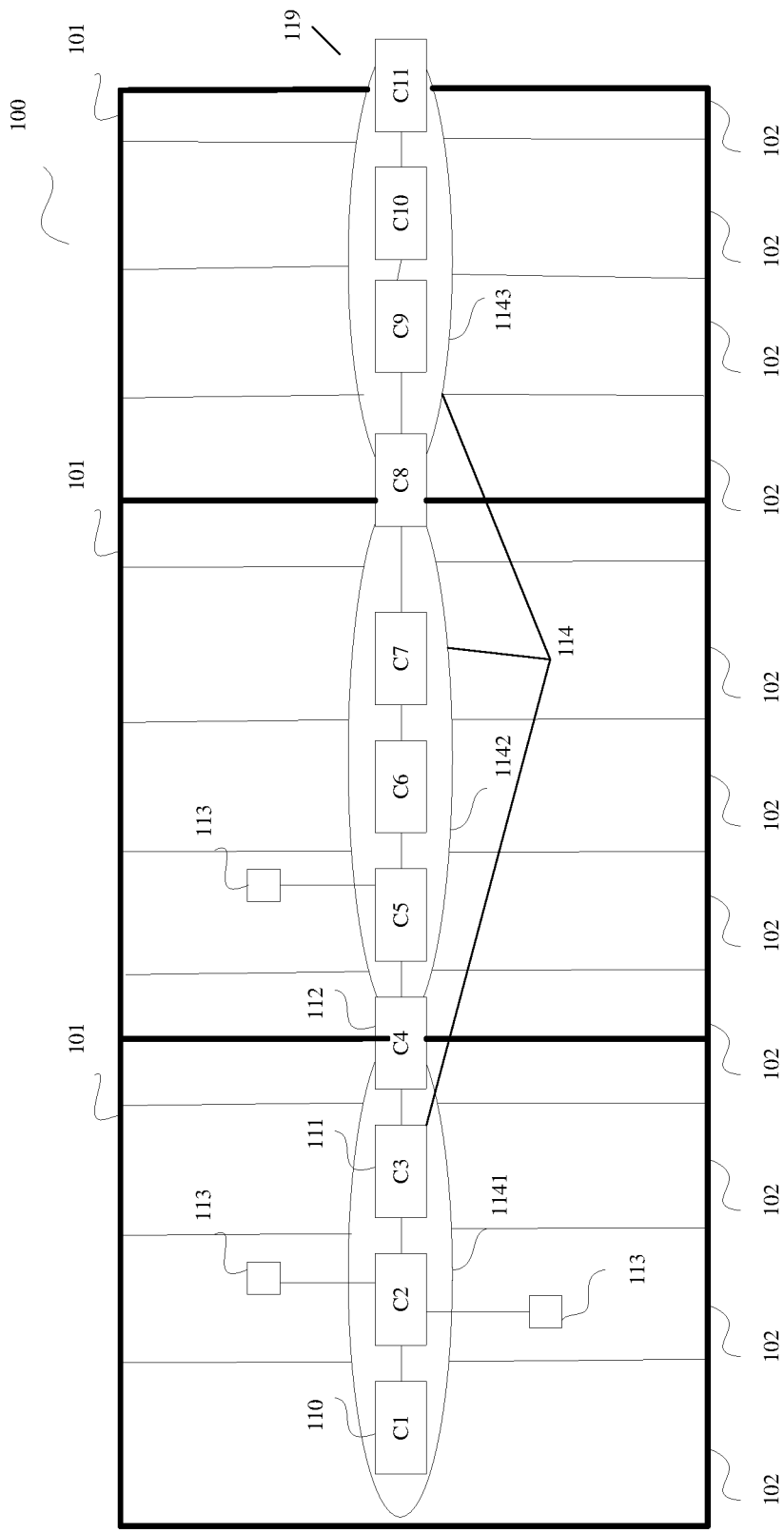
FIG. 1 is a schematic diagram illustrating a conveying line and a matching electric control network, according to some embodiments of the present disclosure.

The following describes this disclosure based on the embodiments, but this disclosure is not merely limited to the embodiments. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. A person skilled in the art may also fully understand this disclosure without the descriptions of the details. To prevent the essence of this disclosure from being confused, well-known methods, procedures, and processes are not described in detail.

A conveying line product is generally used for back-end logistics sorting and outbound delivery of modern logistics merchants. A conveying line is a system formed by connecting various belt conveyors, roller conveyors, and the like. These belt conveyors, roller conveyors, and the like are arranged end to end in a site surrounding a warehouse, a production workshop, and a packaging workshop. The conveying line includes a physical part and a control part. The physical part includes physical devices such as belt conveyors and roller conveyors in the conveying line. To control these physical devices to operate normally, scattered control components for controlling these parts to operate need to be distributed on the conveying line. These control components are communicatively coupled to each other and communicate with each other through control buses, to form the control part. Because the conveying line includes many devices, and various line connections of the control components and the control bus are complex, an on-site engineer needs to perform a large quantity of debugging on signal point positions and collaboration relationships. In addition, there are tremendous differences between actual site forms of each store. As a result, the construction process cannot be standardized.

In the existing technology, the 485 serial port communication technology or the RJ45 Ethernet technology is mainly adopted to standardize the electric control part in a conveying line.

In the 485 serial port communication, all communication devices need to be connected in series in a network, and interact with each other in a host polling manner. When the scale of the physical network is expanded, because communication between each device and a host needs to cost time, polling of the host from a first device to a last device costs a great deal of time. Therefore, the method has a natural disadvantage. Only after being polled, each device can communicate with the host. As a result, the real-time performance is challenged, and a different communication priority cannot be planned for each device. When the scale is expanded to a specific extent, the time delay of the communication is totally unacceptable.

When the RJ45 Ethernet is used for performing communication, each device is communicatively coupled to a same network switch device. Theoretically, compared with the 485 serial port communication, the time delay of the processing is controlled. However, a single network switch device is very high in cost, and the costs of the network wiring and device management will be greatly increased when there are more than thousands of nodes.

In the embodiments of the present disclosure, the conveying line is divided into sections of conveying line regions. In each conveying line region, the control component(s) in the conveying line region control various operations in the region. An electric control part is realized in the form of a plurality of CANs connected in series. In each CAN, there are a plurality of CAN bus network access units. Each CAN bus network access unit corresponds to a conveying line region, and is connected to the control component(s) in the conveying line region. In this way, the conveying line and the electric control network in the conveying line are divided into sections in a manner similar to block building, and a CAN bus network access unit in each section is in a similar structure. Each CAN bus network access unit can be communicatively connected to another CAN bus network access unit in the CAN through an internal bus transceiver, thereby connecting to form a control network. Moreover, each CAN bus network access unit includes a structure with dual CAN buses, where a first port is connected to a first CAN bus. According to whether a variable connection port which is other than the first port, is connected to the first CAN bus or connected to a second CAN bus, the CAN bus network access unit is determined to be a CAN bus network access unit within the CAN, or a CAN connected consecutively to a CAN bus network access unit in another CAN. Through this structure, serial communication between the plurality of CANs is implemented. Therefore, regardless of the length of the conveying line, the entire electric control network can be constructed like block building, thereby standardizing the electric control part used in the conveying line.

Because in this standardization method, the control components in the conveying line regions access buses through standard CAN bus network access units, and are in a dispersed control structure, centralized polling is not required, thereby ensuring the real-time performance and reducing the time delay. In timeliness, a communication between the control components can be performed with a time delay of within 2 ms in the CAN bus network. The serial port communication manner requires host polling. The time delay of a medium-scale network is within 100 ms, and the time delay of a large-scale network (for example, with 10000 nodes) may be more than 1000 ms.

Additionally, costs of the CAN bus transceiver in the foregoing technology are equivalent to costs of an Ethernet chip. However, because there is no network switch required, the costs of network wiring and device management will be greatly reduced.

A conveying line 100 and an electric control network thereof according to some embodiments of the present disclosure are described below with reference to FIG. 1.

The conveying line 100 is an aggregation of all conveying devices for completing article conveying, such as a conveying belt and a conveyor. In current logistics storage and distribution, the conveying line 100 may reach hundreds or thousands of meters. Therefore, in a conventional conveying device, it is impractical for a single electric control component to control running of the entire conveying device. The conveying line 100 needs to be divided into sections 101, and each section includes at least one conveying line region 102. In each conveying line region 102, one or more control components 113 control running of a conveying device in the region 102, and these control components communicate with each other through an electric control network 119. For example, for a 100-meter conveying line, there is a conveying line region 102 every 5 meters, and one or more control components 113 are arranged in each conveying line region 102, to control running of a device in conveying line the region 102.

A CAN bus network access unit 110 is arranged in each conveying line region 102, and is responsible for connecting the control component 113 to the electric control network 119 in the conveying line region 102. A control signal of the control component 113 through the CAN bus network access unit 110 is transferred to a control component 113 connected to another CAN bus network access unit 110 on the electric control network 119, to perform mutual communication between the control components 113. These CAN bus network access units 110 connected in series form the electric control network 119.

The electric control network 119 in the conveying line 100 in FIG. 1 includes a plurality of CANs 114. Each CAN 114 is illustrated in an elliptical part in a bold-line box in FIG. 1. FIG. 1 illustrates a first CAN 1141, a second CAN 1142, and a third CAN 1143, but a person skilled in the art understands that the electric control network 119 may alternatively include another quantity of CANs, for example, 2, 4, or 5.

CAN is an abbreviation of controller area network, and is one of internationally relatively widely applied on-site buses. In a CAN, a message of a node is broadcasted to all other nodes in the CAN. Therefore, it may be considered that each message in a CAN is sent to all nodes in the CAN through a same CAN bus. Messages in different CANs are sent by using different CAN buses. Because the conveying line may have a length of a few kilometers and contain thousands of or even tens of thousands CAN bus network access units 110, and a coverage distance of a CAN cannot cover such a length, the form of a plurality of CANs 114 connected in series is used in embodiments of the present disclosure. A routing CAN bus network access unit 112 is connected between two neighboring CANs 114. The routing CAN bus network access unit 112 belongs to both of the two neighboring CANs 114, and is responsible for forwarding (broadcasting) a message of a CAN 114 to another CAN 114. Because the two CANs 114 transmit messages by using different CAN buses, it is usually required that the routing CAN bus network access unit 112 can be connected to both of the two CAN buses at the same time, and can forward a message on a CAN bus to another CAN bus. Routing CAN bus network access units 112 shown in FIG. 1 include C4, C8, and C11, where CX is an identifier of an Xth CAN bus network access unit in the figure.

In addition to the routing CAN bus network access unit 112, another type of CAN bus network access unit 110 is an internal CAN bus network access unit 111, that is, a CAN bus network access unit within the CAN 114, and other than a routing CAN bus network access unit 112. Because messages are transmitted within a CAN 114 by using a same CAN bus, a message on one CAN 114 is not required to forwarded to another CAN 114. Internal CAN bus network access units 111 shown in FIG. 1 include C1, C2, C3, C5, C6, C7, C9, and C10.

A specific structure of a CAN bus network access unit 110 according to some embodiments of the present disclosure is described in detail below with reference to FIG. 2A. As described above, the CAN bus network access unit 110 refers to a component responsible for connecting a control component 113 to the electric control network 119, where the control component 113 is in a conveying line region 102 of the conveying line 100. The control component 113 refers to a component that may monitor bus messages in the conveying line region 102 and send a bus message at an appropriate moment, to communicate with a control component 113 in another conveying line region 102. The electric control network 119 refers to an electric control part of the conveying line 100, and is configured to transmit a control signal for a physical conveying device in the conveying line 100.

Figure 2A:
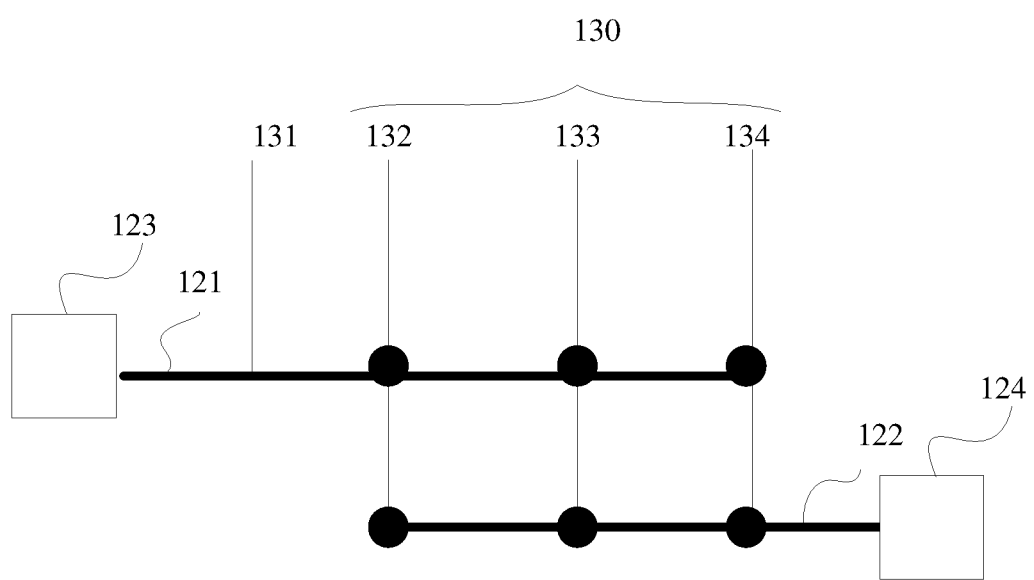
FIG. 2A is a physical structural diagram of a CAN bus network access unit, according to some embodiments of the present disclosure.

As shown in FIG. 2A, the CAN bus network access unit 110 includes: a first CAN bus 121, a second CAN bus 122, a first CAN bus transceiver 123, a second CAN bus transceiver 124, a first port 131, and a plurality of variable connection ports 130 including a second port 132, a third port 133, and a fourth port 134. At least one of the plurality of variable connection ports 130 may be connected to any bus of the first CAN bus 121 and the second CAN bus 122, and may alternatively be connected to neither of the two buses. As described above, when the CAN bus network access unit 110 is used as the routing CAN bus network access unit 112, different CAN buses need to be connected consecutively. In this case, one of the second port 132, the third port 133, and the fourth port 134 may be connected to the second CAN bus 122. Because the first port 131 is always connected to the first CAN bus 121, different CAN buses connected consecutively is realized. When the CAN bus network access unit 110 is used as the internal CAN bus network access unit 111, a same CAN bus needs to be connected consecutively. In this case, the second port 132, the third port 133, and the fourth port 134 may be connected to the first CAN bus 121. Because the first port 131 is always connected to the first CAN bus 121, a same CAN bus connected consecutively is realized.

Although the plurality of variable connection ports 130 including the second port 132, the third port 133, and the fourth port 134 are described above exemplarily, the plurality of variable connection ports may actually alternatively include another quantity of ports, for example, may further include a fifth port and a sixth port according to needs, and may alternatively include only the second port 132 and the third port 133.

The first CAN bus transceiver 123 is connected to the first CAN bus 121, and is configured to communicate with a first CAN bus transceiver 123 of another CAN bus network access unit 110 in the electric control network 119, thereby establishing a first CAN communication. The second CAN bus transceiver 124 is connected to the second CAN bus 122, and is configured to communicate with a second CAN bus transceiver 124 of the another CAN bus network access unit 110 in the electric control network 119. It should be noted that, although a plurality of CAN bus network access units 110 sequentially connected in each CAN are shown in FIG. 1 (for example, the CAN bus network access unit C1 is connected to the CAN bus network access unit C2, and the CAN bus network access unit C2 is connected to the CAN bus network access unit C3), actually, after a CAN bus network access unit 110 sends a message through its first CAN bus transceiver 123 or second CAN bus transceiver 124, a first CAN bus transceiver 123 or second CAN bus transceiver 124 of other CAN bus networks access unit 110 that are connected to the first CAN bus or the second CAN bus may receive the message. As long as a CAN bus network access unit 110 is connected to a bus, sending a message may be considered as a type of broadcast. Therefore, in FIG. 1, if the CAN bus network access unit C2 sends a message, because the CAN bus network access units C1, C3, and C4 are all connected to the first CAN bus 121, all the CAN bus network access units C1, C3, and C4 receive the message, that is, the message is broadcast to the CAN bus network access units C1, C3, and C4.

As shown in FIG. 2A, the first port 131 is connected to the first CAN bus 121. At least one of the plurality of variable connection ports 130 is connected to one of the first CAN bus 121 and the second CAN bus 122, or is connected to neither the first CAN bus 121 nor the second CAN bus 122. Therefore, the CAN bus network access units 110 can be in different type according to the different connections, that is, a straight-line CAN bus network access unit or a transplanter CAN bus network access unit, which are described in detail below.

The CAN bus network access unit 110 shown in FIG. 2A may be applied in a logistics scenario, and is used as a network access unit of the electric control network 119 in the conveying line 100. At least one of the first port 131 and the plurality of variable connection ports 130 is connected to a control component 113 configured to control logistics conveying in the conveying line 100.

Moreover, the CAN bus network access unit 110 shown in FIG. 2A may be applied in a production line scenario, and is used as a network access unit of the electric control network in the product production line. At least one of the first port 131 and the plurality of variable connection ports 130 is connected to a control component 113 configured to control the product production in the product production line. There are links such as raw material feeding, mixing, stirring, baking, drying in the shade, and packaging on the product production line. In each link, scattered control components for controlling machine operating of these links are required, and these control components are connected to each other and communicate with each other through control buses. Therefore, the control components and the control buses form an electric control network in the product production line. If the production line is sufficiently long, the production line needs to be divided into sections of production line regions. In each production line region, one or more corresponding control components control various operations in the production line region. The electric control network is realized in a form of a plurality of CANs connected in series. Each CAN includes a plurality of CAN bus network access units, and each CAN bus network access unit corresponds to a production line region, and is connected to the control component(s) in the production line region. In this way, the production line and the electric control network in the production line are divided into sections in a manner similar to block building, and the CAN bus network access units in each section are in a similar structure.

Moreover, the CAN bus network access unit 110 shown in FIG. 2A can be applied in an Internet of Things scenario, and the CAN bus network access unit 110 is a network access unit in the Internet of Things. At least one of the first port 131 and the plurality of variable connection ports 130 is connected to an Internet of Things device for accessing the Internet of Things, for example, a signal lamp, a camera, a road horizontal bar control apparatus, or a transportation control node. The entire Internet of Things is divided into a plurality of Internet of Things regions, Internet of Things devices in an Internet of Things region are connected to CAN buses through the CAN bus network access unit 110. CAN buses in an Internet of Things region and connected Internet of Things devices are considered as a CAN as a whole.

Figure 2B:
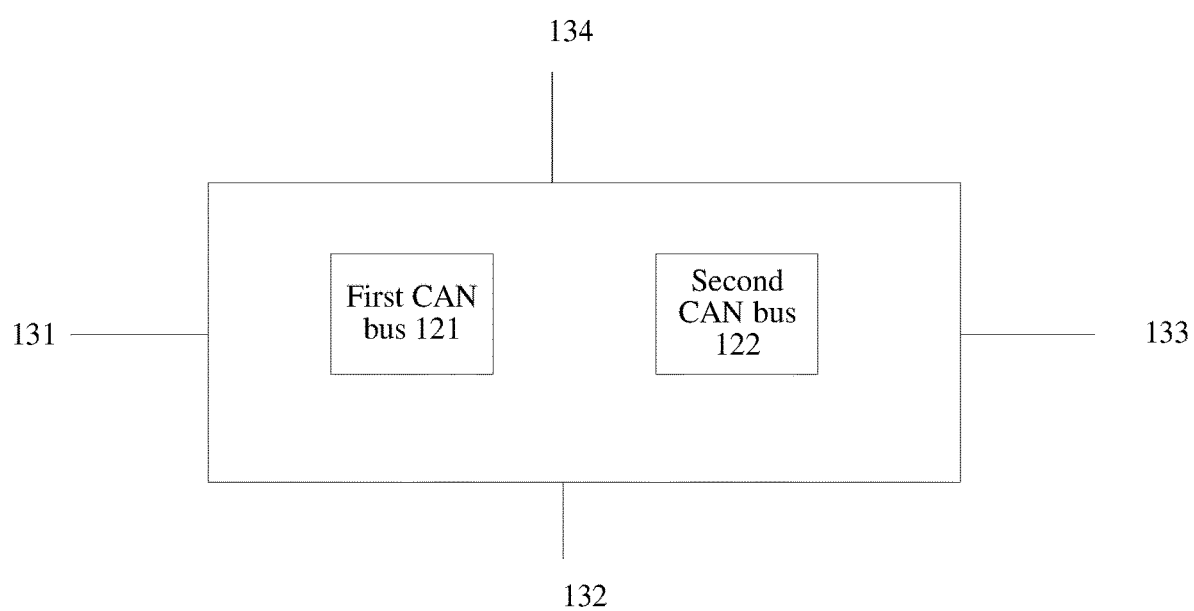
FIG. 2B is a logical structural diagram of a CAN bus network access unit, according to some embodiments of the present disclosure.

FIG. 2B is a logical structural diagram of a CAN bus network access unit 110, according to some embodiments of the present disclosure. The logical structural diagram blurs an internal connection relationship in the CAN bus network access unit 110 in FIG. 2A. The internal connection relationship is considered as a black box, and the CAN bus network access unit 110 is only considered as a box including four logical ports 131 to 134. The connection relationship between each of the logical ports 131 to 134 and the first CAN bus 121 or the second CAN bus 122 is hidden. The logical ports 131 to 134 may be logical entries, and may alternatively be logical exits. The logical entry means that if a port is connected to the first CAN bus 121 or the second CAN bus 122, and an input signal is provided to the CAN bus, the port is a logical entry. The logical exit means that if a port is connected to the first CAN bus 121 or the second CAN bus 122, and a signal is outputted from the CAN bus to the port, the port is a logical exit. Because of being fixedly connected to the first CAN bus 121, the first port 131 can be only a logical entry. Each port of the second port 132, the third port 133, and the fourth port 134 may be connected to the first CAN bus 121, and may alternatively be connected to the second CAN bus 122. When the port is connected to the first CAN bus 121, the port just forms an exit of a signal of a logical entry of the first port 131, i.e., a logical exit. When the port is connected to the second CAN bus 122, the port is connected to a new CAN bus and inputs a signal to the new CAN bus, i.e., the port is a logical entry.

A straight-line CAN bus network access unit and a transplanter CAN bus network access unit are described in detail below.

The CAN bus network access unit 110 shown in FIG. 2B is a straight-line CAN bus network access unit if only the first port 131 and the third port 133 are used, and the second port 132 and the fourth port 134 are not used (the second port 132 and the fourth port 134 are shielded by a physical device, for example, closed by using a cover plate). In this case, the first port 131 is fixedly connected to the first CAN bus 121, and is definitely a logical entry. The third port 133 can be only connected to only the first CAN bus 121 and is used as a logical exit. If the third port 133 is connected to the second CAN bus 122, a signal flowing in from the first port 131 cannot flow out. Therefore, the third port 133 can be used only as a logical exit of the signal flowing in from the first port 131, and is connected to the first CAN bus 121. Any one of the second port 132 and the fourth port 134 is connected to neither the first CAN bus 121 nor the second CAN bus 122.

The CAN bus network access unit 110 shown in FIG. 2B is a transplanter CAN bus network access unit if the first port 131, the second port 132, the third port 133, and the fourth port 134 can be all used. In this case, the first port 131 is fixedly connected to the first CAN bus 121, and is definitely a logical entry. The second port 132, the third port 133, and the fourth port 134 may be connected to the first CAN bus 121 and used as logical exits, or may be connected to the second CAN bus 122 and used as logical entries.

Figure 3A:
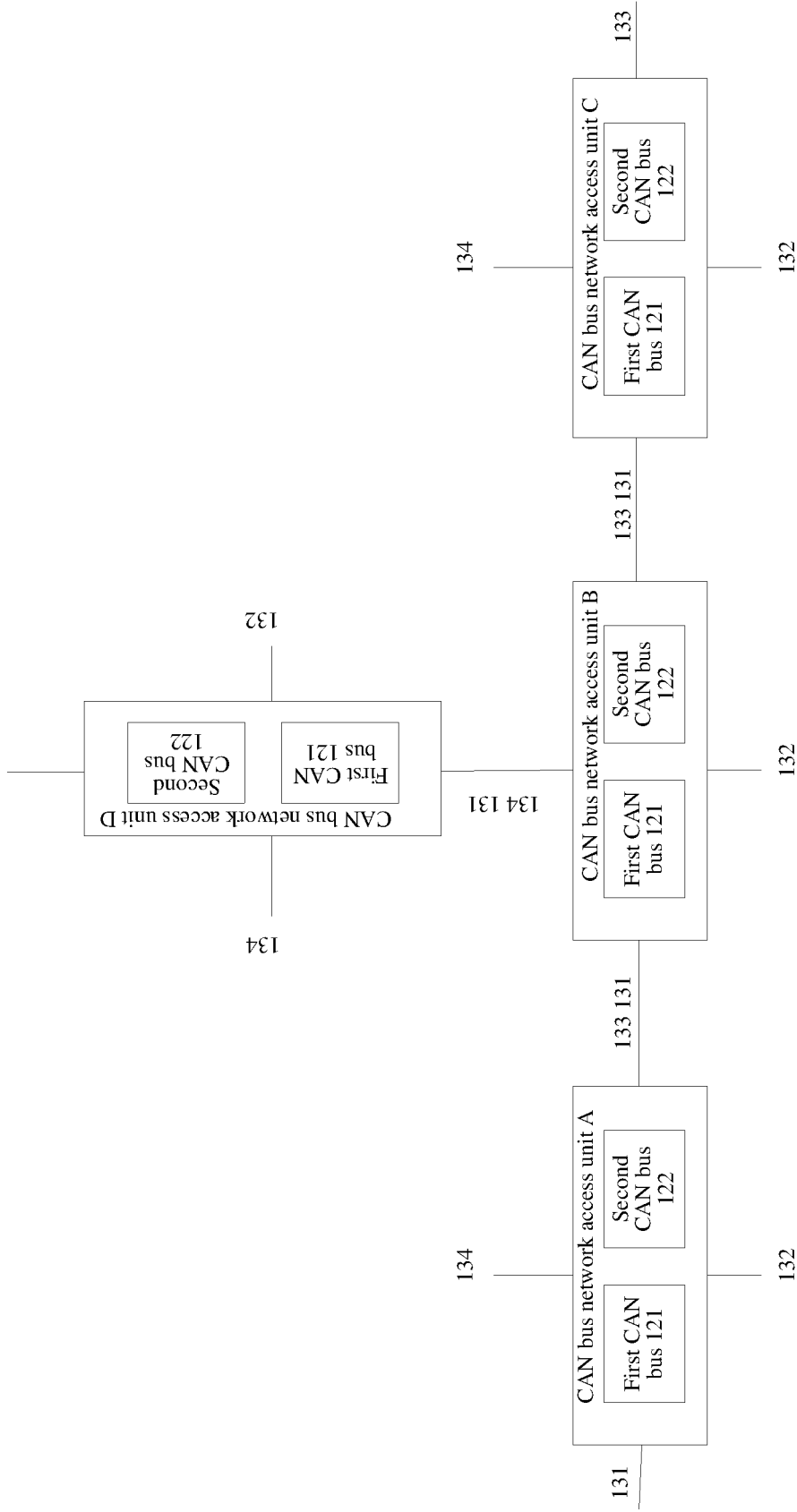
FIG. 3A is a diagram illustrating a connection relationship between a straight-line CAN bus network access unit and surrounding CAN bus network access units, according to some embodiments of the present disclosure.

The routing CAN bus network access unit 112 is definitely a transplanter CAN bus network access unit. This is because, in order to forward a message from the first CAN bus 121 to the second CAN bus 122 by the routing CAN bus network access unit, the second port 132, the third port 133, and the fourth port 134 must be connected to the second CAN bus 122. The internal CAN bus network access unit 111 can be a straight-line CAN bus network access unit or a transplanter CAN bus network access unit. Each internal CAN bus network access unit 111 in the electric control network shown in FIG. 1 is a straight-line CAN bus network access unit. In a CAN bus network access unit interconnection structure in FIG. 3A, each of the three internal CAN bus network access units 111 (e.g., CAN bus network access units A, B, and C) only has a first port 131 and a third port 133 used. Therefore all the three internal CAN bus network access units 111 (e.g., CAN bus network access units A, B, and C) are straight-line CAN bus network access unit. However, in a CAN bus network access unit interconnection structure in FIG. 3B, among the four internal CAN bus network access units 111 (e.g., CAN bus network access units A, B, C, and D), a first port 131, a third port 133, and a fourth port 134 of the CAN bus network access unit B are all used, where the fourth port 134 of the CAN bus network access unit B is connected to a first port 131 of the CAN bus network access unit D. In this case, although the CAN bus network access unit B is not the routing CAN bus network access unit 112, a transplanter CAN bus network access unit can be used.

Figure 3B:
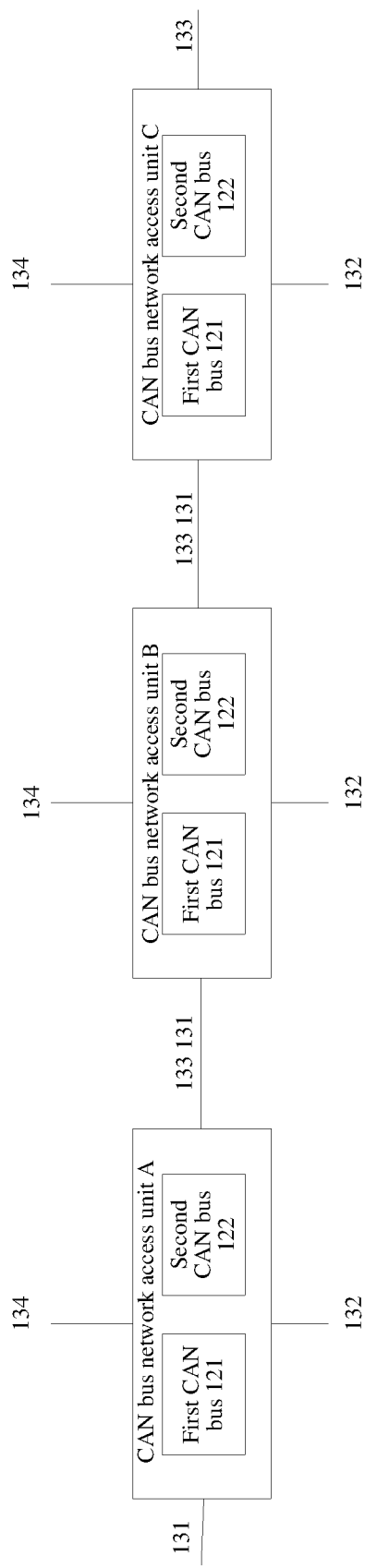
FIG. 3B is a diagram illustrating a connection relationship between a transplanter CAN bus network access unit and surrounding CAN bus network access units, according to some embodiments of the present disclosure.

Additionally, a straight-line CAN bus network access unit (for example, CAN bus network access units A to C shown in FIG. 3A) may be connected to straight-line CAN bus network access units, and a straight-line CAN bus network access unit (for example, CAN bus network access units A, C, and D shown in FIG. 3B) may alternatively be connected to transplanter CAN bus network access units. However, a transplanter CAN bus network access unit (for example, a CAN bus network access unit B shown in FIG. 3B) can be only connected to a straight-line CAN bus network access unit.

To more typically illustrate how to transfer messages by CAN bus network access units 110 in different CANs, FIG. 4 shows an electric control network including only a first CAN 1141 and a second CAN 1142. Since the electric control network includes only two CANs, message transfer between CAN bus network access units 110 in different CANs can be better indicated.

As shown in FIG. 4, the first CAN 1141 and the second CAN 1142 have a common routing CAN bus network access unit 112, i.e., C4. In addition to the routing CAN bus network access unit 112, the first CAN 1141 further includes 3 internal CAN bus network access units 111, i.e., C1 to C3. In addition to the routing CAN bus network access unit 112, the second CAN 1142 further includes 3 internal CAN bus network access units 111, i.e., C5 to C7. Each of these CAN bus network access units has the structures shown in FIG. 2A and FIG. 2B. Each of the internal CAN bus network access units C1 to C3 can be a straight-line CAN bus network access unit, that is, the first port 131 and the third port 133 are connected to the first CAN bus 121, and the remaining ports are not used. Each of the internal CAN bus network access units C1 to C3 can alternatively be a transplanter CAN bus network access unit, that is, the first port 131 is connected to the first CAN bus 121, and the second port 132, the third port 133, and the fourth port 134 may be connected to the first CAN bus 121 or the second CAN bus 122. However, actually the second port 132, the third port 133, and the fourth port 134 are only allowed to connect to the first CAN bus 121. The structures of the internal CAN bus network access units C5 to C7 are similar. The routing CAN bus network access unit C4 is in the form of a transplanter CAN bus network access unit, that is, the first port 131 is connected to the first CAN bus 121, and at least one of the second port 132, the third port 133, and the fourth port 134 is connected to the second CAN bus 122.

Transmitting messages in the electric control network includes two cases. One case is that messages are transmitted between CAN bus network access units 110 of a same CAN, and the other case is that messages are transmitted between CAN bus network access units 110 of different CANs.

Figure 4A:
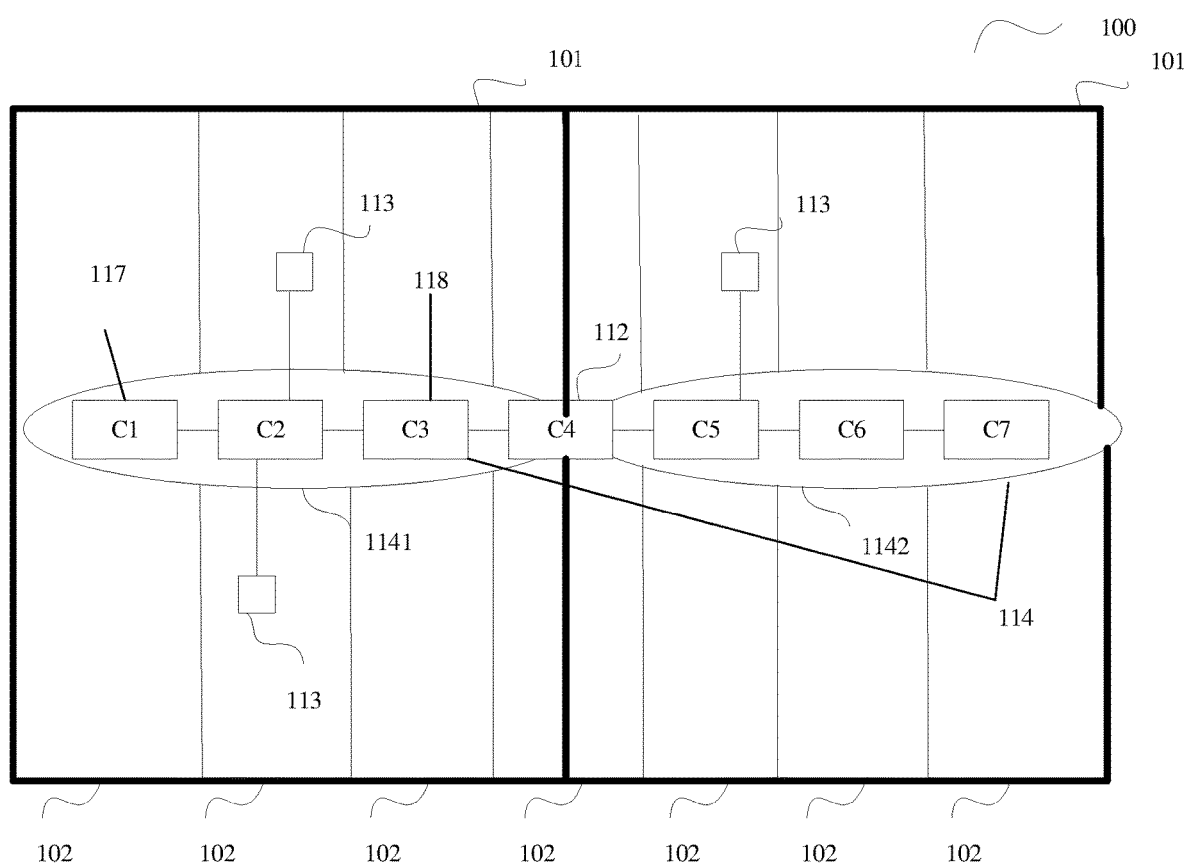
FIG. 4A is a schematic diagram illustrating a message sending CAN bus network access unit and a message receiving CAN bus network access unit in a same CAN, according to some embodiments of the present disclosure.

For the case that messages are transmitted between CAN bus network access units 110 of a same CAN, as shown in FIG. 4A, a message sending CAN bus network access unit 117 is C1, and a message receiving CAN bus network access unit 118 is C3. The message sending CAN bus network access unit 117 refers to a CAN bus network access unit for sending a control message to the electric control network, and then transferring the control message to another CAN bus network access unit on the electric control network. The message receiving CAN bus network access unit 118 refers to a CAN bus network access unit for receiving the control message sent by the message sending CAN bus network access unit 117. The message sending CAN bus network access unit 117 and the message receiving CAN bus network access unit 118 are both located in the first CAN 1141.

The message sending CAN bus network access unit 117 sends a directing message which is needed to reach the message receiving CAN bus network access unit 118. The directing message refers to a message needing to be only sent to a particular target (e.g., a message receiving CAN bus network access unit), and the remaining message receiving CAN bus network access units may discard the message after receiving the message. The directing message contains an identifier (for example, C3) of the message receiving CAN bus network access unit 118 that the message needs to reach and message content. During sending, first, the message sending CAN bus network access unit 117 broadcasts a directing message to all other CAN bus network access units in the first CAN 1141 through a transceiver thereof, where the directing message carries an identifier of the message receiving CAN bus network access unit 118 that the directing message needs to reach. If a CAN bus network access unit 110 receiving the directing message is an internal CAN bus network access unit 111, the CAN bus network access unit determines whether the identifier of the message receiving CAN bus network access unit contained in the message matches its own identifier. If the identifier of the message receiving CAN bus network access unit contained in the massage matches the identifier of the internal CAN bus network access unit, indicating that the internal CAN bus network access unit is the message receiving CAN bus network access unit 118 that the directing message needs to reach, the internal CAN bus network access unit reserves the directing message. If the identifier of the message receiving CAN bus network access unit contained in the massage does not match the identifier of the internal CAN bus network access unit, the internal CAN bus network access unit discards the message. If a CAN bus network access unit 110 receiving the directing message is the routing CAN bus network access unit 112, and it is determined that the identifier of the message receiving CAN bus network access unit contained in the message is in a first CAN bus network access unit identifier list, indicating that the message has been received by a CAN bus network access unit 111 in the first CAN 1141, the directing message is discarded.

As shown in FIG. 4A, the message sending CAN bus network access unit C1 broadcasts a directing message to the CAN bus network access units C2 and C3 in the first CAN 1141. After receiving the directing message, the CAN bus network access unit C2 compares the identifier (i.e., C3) of the message receiving CAN bus network access unit 118 in the message with its own identifier C2. Finding that the identifier C2 does not match the identifier (i.e., C3) of the message receiving CAN bus network access unit 118, the CAN bus network access unit C2 discards the message. After receiving the directing message, the CAN bus network access unit C3 compares the identifier (i.e., C3) of the message receiving CAN bus network access unit 118 in the directing message with its own identifier C3. The CAN bus network access unit C3 recognized that the CAN bus network access unit C3 is the message receiving CAN bus network access unit 118, then reserves the message.

Figure 4B:
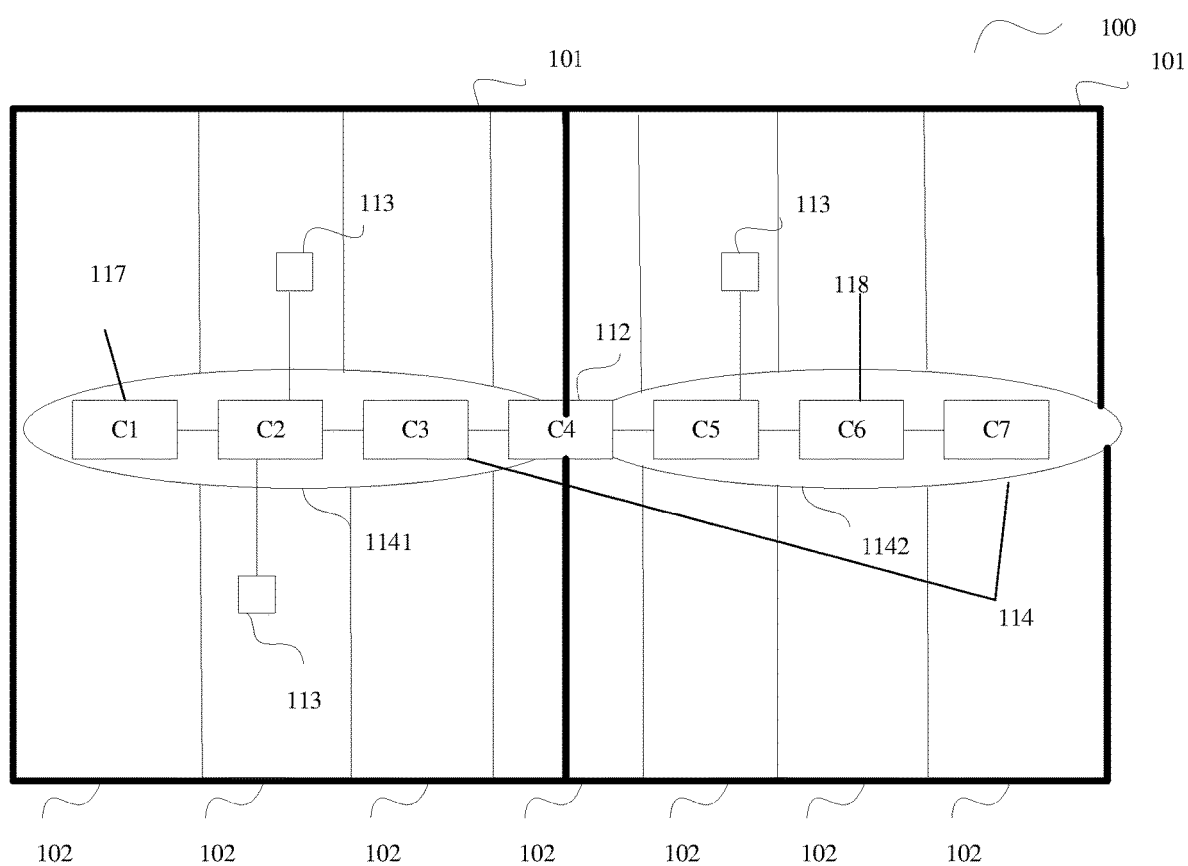
FIG. 4B is a schematic diagram illustrating a message sending CAN bus network access unit and a message receiving CAN bus network access unit in different CANs, according to some embodiments of the present disclosure.

For the case that messages are transmitted between CAN bus network access units 110 of different CANs, as shown in FIG. 4B, the message sending CAN bus network access unit 117 is C1, located in the first CAN 1141. The message receiving CAN bus network access unit 118 is C6, located in the second CAN 1142.

The message sending CAN bus network access unit 117 broadcasts a directing message to another CAN bus network access unit 110 in the first CAN 1141 through a first CAN transceiver 123, and the directing message contains an identifier of the message receiving CAN bus network access unit 118. After receiving the message, the internal CAN bus network access unit 110 receiving the directing message in the first CAN 1141 determines that the identifier of the message receiving CAN bus network access unit 118 contained in the message does not match its own identifier, and discards the message. After receiving the message, the routing CAN bus network access unit 112 between the first CAN 1141 and the second CAN 1142 determines that the identifier of the message receiving CAN bus network access unit 118 contained in the message is not in the first CAN bus network access unit identifier list, and broadcasts the directing message to all CAN bus network access units in the second CAN 1142 through a second CAN transceiver 124. The CAN bus network access unit 110 receiving the directing message in the second CAN 1142 determines whether the contained identifier of the message receiving CAN bus network access unit 118 matches its own identifier. If the identifier of the message receiving CAN bus network access unit contained in the massage matches the identifier of the CAN bus network access unit 110, indicating that the internal CAN bus network access unit 110 is the message receiving CAN bus network access unit 118, the internal CAN bus network access unit reserves the directing message. If the identifier of the message receiving CAN bus network access unit contained in the massage does not match the identifier of the internal CAN bus network access unit, the internal CAN bus network access unit discards the message.

As shown in FIG. 4B, the message sending CAN bus network access unit C1 broadcasts a directing message to the CAN bus network access units C2 and C3 in the first CAN 1141 through the first CAN transceiver 123. The CAN bus network access unit C2 compares an identifier C6 of the message receiving CAN bus network access unit 118 in the directing message with its own identifier C2. Finding that the identifiers do not match each other, indicating that the CAN bus network access unit C2 is not the message receiving CAN bus network access unit 118, and the CAN bus network access unit C2 discards the message. The CAN bus network access unit C3 compares the identifier C6 of the message receiving CAN bus network access unit 118 in the directing message with its own identifier C3. Finding that the identifiers do not match each other, the CAN bus network access unit C3 discards the message. CAN bus network access unit C4 is a routing CAN bus network access unit 112. In this case, the routing CAN bus network access unit 112 compares the identifier C6 of the message receiving CAN bus network access unit 118 contained in the message with the first CAN bus network access unit identifier list, and finds that the identifier is not in the first CAN bus network access unit identifier list, meaning that the message receiving CAN bus network access unit 118 is not in the first CAN 1141. Therefore, the routing CAN bus network access unit 112 should broadcast, in the second CAN 1142, the directing message to the CAN bus network access units C5 to C7 in the second CAN 1142 through the second CAN transceiver 124. The CAN bus network access unit C5 determines that the identifier C6 of the message receiving CAN bus network access unit 118 contained in the message does not match its own identifier C5, indicating that the CAN bus network access unit C5 itself is not the message receiving CAN bus network access unit 118, and therefore discards the message. The CAN bus network access unit C6 determines that the identifier C6 of the message receiving CAN bus network access unit 118 contained in the message matches its own identifier C6, indicating that the CAN bus network access unit C6 itself is the message receiving CAN bus network access unit 118, and therefore reserves the directing message. The CAN bus network access unit C7 determines that the identifier C6 of the message receiving CAN bus network access unit 118 contained in the message does not match its own identifier C7, indicating that the CAN bus network access unit C7 itself is not the message receiving CAN bus network access unit 118, and therefore discards the message.

If there are more than two CANs, it is possible that the message receiving CAN bus network access unit 118 still cannot be found in the second CAN 1142, and therefore the message may be forwarded to another CAN by a routing CAN bus network access unit 112 between the second CAN 1142 and another CAN, until the message receiving CAN bus network access unit 118 is found. For example, in FIG. 1, in addition to the first CAN 1141 and the second CAN 1142, there is further a third CAN 1143. It is assumed that the message sending CAN bus network access unit is C1 and the message receiving CAN bus network access unit is C10. In this case, a CAN bus network access unit C8 between the second CAN 1142 and the third CAN 1143 can also receive the message. The routing CAN bus network access unit C8 compares the identifier C10 of the message receiving CAN bus network access unit 118 contained in the message with the second CAN bus network access unit identifier list, and finds that the identifier C10 is not in the second CAN bus network access unit identifier list, meaning that the message receiving CAN bus network access unit C10 is not in the second CAN 1142, and broadcasts the directing message to the CAN bus network access units C9 to C11 in the third CAN 1143. The CAN bus network access unit C9 determines that the identifier C10 of the message receiving CAN bus network access unit 118 contained in the message does not match its own identifier C9, indicating that the CAN bus network access unit C9 itself is not the message receiving CAN bus network access unit 118, and therefore discards the message. C10 determines that the identifier C10 of the message receiving CAN bus network access unit 118 contained in the message matches its own identifier C10, indicating that the CAN bus network access unit itself is the message receiving CAN bus network access unit 118, and therefore reserves the directing message. The CAN bus network access unit C11 determines that the identifier C10 of the message receiving CAN bus network access unit 118 contained in the message does not match its own identifier C11, indicating that the CAN bus network access unit C11 itself is not the message receiving CAN bus network access unit 118, and therefore discards the message.

Figure 5:
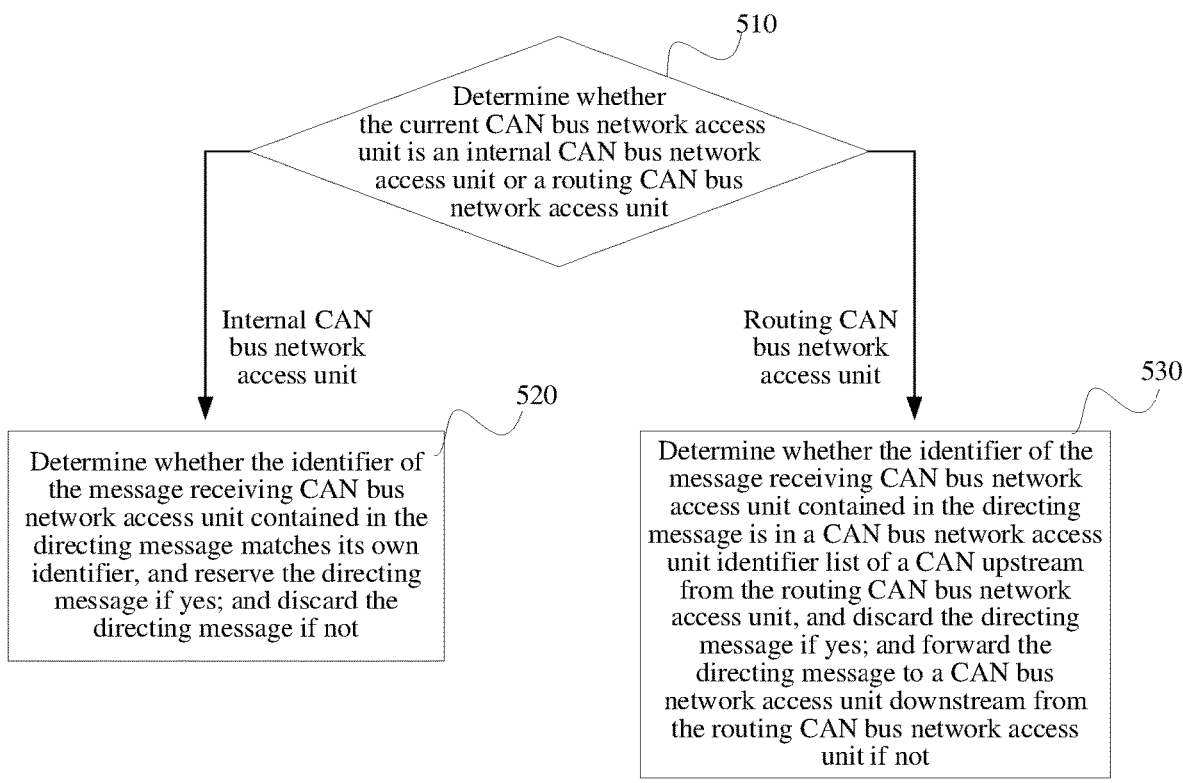
FIG. 5 is a flowchart of a directing message processing method in an electric control network, according to some embodiments of the present disclosure e.

As shown in FIG. 5, a directing message processing method in an electric control network 119 is provided. The method is performed by a current CAN bus network access unit receiving a directing message in the electric control network. The method includes steps 510 to 530.

At step 510, whether the current CAN bus network access unit is an internal CAN bus network access unit or a routing CAN bus network access unit is determined.

At step 520, if the current CAN bus network access unit is an internal CAN bus network access unit, whether the identifier of the message receiving CAN bus network access unit contained in the directing message matches the identifier of the current CAN bus network access unit is determined. If the identifiers match each other, the current CAN bus network access unit reserves the directing message. If the identifiers do not match each other, the current CAN bus network access unit discards the directing message.

At step 530, if the current CAN bus network access unit is a routing CAN bus network access unit, whether the identifier of the message receiving CAN bus network access unit contained in the directing message is in a CAN bus network access unit identifier list of a CAN upstream from the routing CAN bus network access unit is determined. If the identifier of the message receiving CAN bus network access unit contained in the directing message is in the CAN bus network access unit identifier list of a CAN upstream from the routing CAN bus network access unit, the current CAN bus network access unit discards the directing message. If the identifier of the message receiving CAN bus network access unit contained in the directing message is not in the CAN bus network access unit identifier list of a CAN upstream from the routing CAN bus network access unit, the current CAN bus network access unit forwards the directing message to a CAN bus network access unit downstream from the routing CAN bus network access unit.

Because the specific process of the foregoing method has actually been shown in detail above with reference to FIG. 4A and FIG. 4B, details will not be described herein.

Through the mechanism of transferring a message between different CAN bus network access units 110 in a same CAN and the mechanism of transferring a message between CAN bus network access units 110 in different CANs, convenient transfer of a message in the electric control network 119 can be implemented. The transfer is completely performed dispersedly between CAN bus network access units 110, and centralized polling is not required, thereby improving message transfer efficiency. Moreover, because there is no network switch device required, the costs of network wiring and device management are reduced.

There are thousands of control components 113 and thousands of CAN bus network access units 110 on a large-scale conveying line 100, to complete electric control of devices on the entire large-scale conveying line 100. These CAN bus network access units 110 include straight-line CAN bus network access units, and also include transplanter CAN bus network access units. Moreover, connection manners of ports are diversified, and particularly for a transplanter, connection manners of ports are quite flexible. To find the connection structure of the entire electric control network 119, connection conditions of ports of each CAN bus network access unit 110 need to be manually investigated one by one, and a large quantity of manual costs are required. Some embodiments of the present disclosure further provide a method that can automatically detect connection conditions of ports of each CAN bus network access unit 110 in the electric control network 119. In the method, a plurality of sequential scanning periods are set. In each scanning period, a connection relationship between each port in each CAN bus network access unit 110 and a first CAN bus 121 or a second CAN bus 122 is set. Each port sends a message according to a predetermined rule, and the message indicates a number of the port and a connection relationship between the port and the first CAN bus 121 or the second CAN bus 122. When a port of another CAN bus network access unit 110 connected to the port receives the message, the another CAN bus network access unit 110 can recognize the connected CAN bus network access unit 110, a number of the connected port, whether the port is a logical entry or exit, and other information, thereby automatically obtaining a connection condition of each port of the CAN bus network access unit 110. Therefore, manual troubleshooting is not required, and efficiency of checking the connection condition of each port of the CAN bus network access unit 110 is increased.

It can be known from above that, for checking the connection condition of each port of the CAN bus network access unit 110, in an aspect, each port of the CAN bus network access unit 110 connects to the first CAN bus 121 or the second CAN bus 122 in a plurality of sequential scanning periods and sends a message according to a predetermined rule, that is, status notification; and in another aspect, a status notification message is received and then processed. Actually, each port of each CAN bus network access unit 110 not only performs the former, but also performs the latter. The former is performed to cause a neighboring CAN bus network access unit 110 to find a status of the current CAN bus network access unit, and the latter is performed to check out a status of the neighboring CAN bus network access unit 110. The former and the latter supplement each other. A status notification method for a CAN bus network access unit and a connection status detection method for a CAN bus network access unit are described below respectively.

Figure 6:
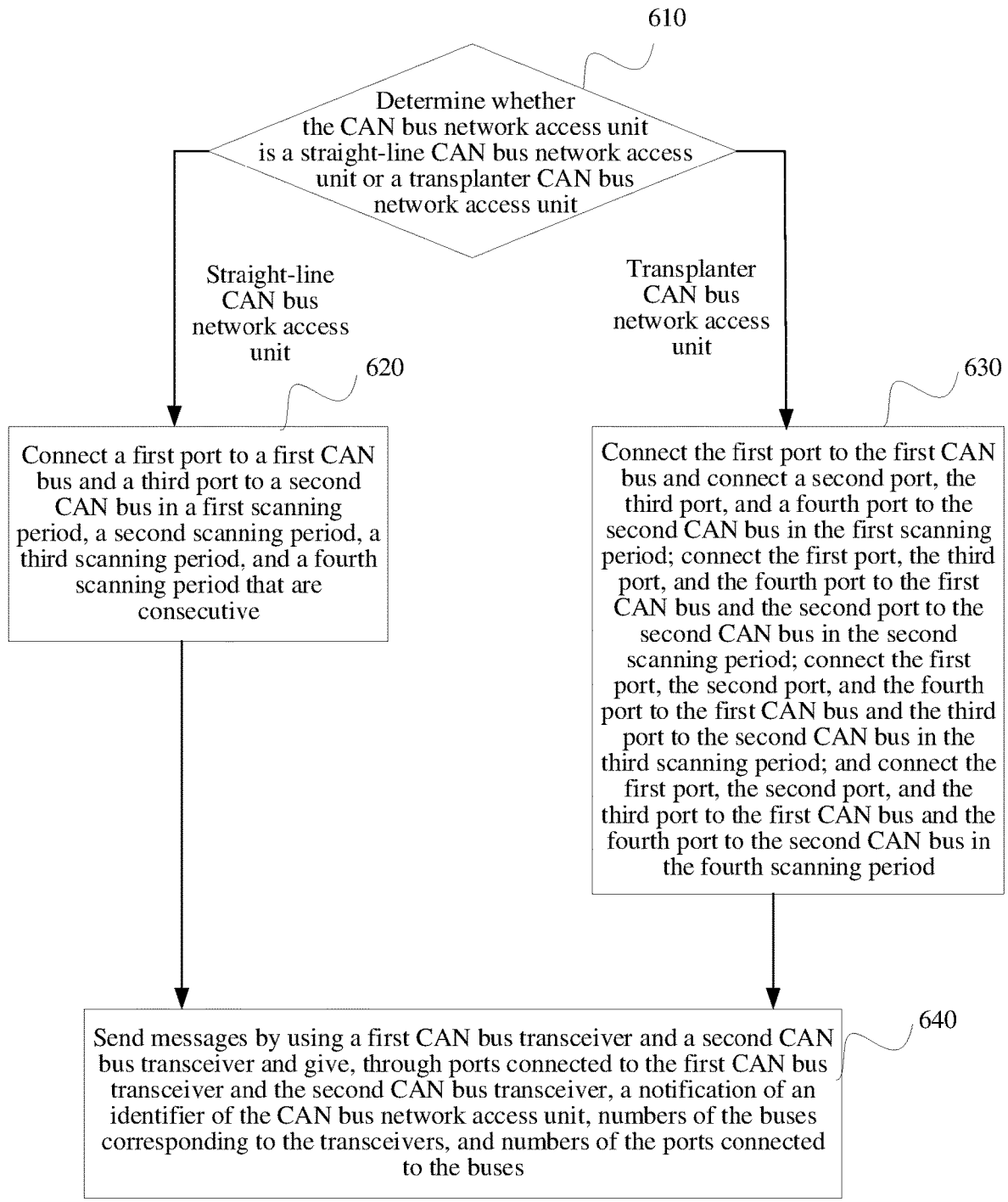
FIG. 6 is a flowchart of a status notification method for a CAN bus network access unit, according to some embodiments of the present disclosure.

As shown in FIG. 6, a status notification method for a CAN bus network access unit, according to some embodiments of the present disclosure includes step 610 to 640.

At step 610, whether the CAN bus network access unit is a straight-line CAN bus network access unit or a transplanter CAN bus network access unit is determined.

At step 620, if the CAN bus network access unit is the straight-line CAN bus network access unit, a first port is connected to a first CAN bus and a third port is connected to a second CAN bus in a first scanning period, a second scanning period, a third scanning period, and a fourth scanning period that are consecutive.

At step 630, if the CAN bus network access unit is the transplanter CAN bus network access unit, the first port is connected to the first CAN bus and a second port, a third port, and a fourth port are connected to the second CAN bus in the first scanning period; the first port, the third port, and the fourth port are connected to the first CAN bus and the second port is connected to the second CAN bus in the second scanning period; the first port, the second port, and the fourth port are connected to the first CAN bus and the third port is connected to the second CAN bus in the third scanning period; and the first port, the second port, and the third port are connected to the first CAN bus and the fourth port is connected to the second CAN bus in the fourth scanning period.

At step 640, messages are sent by using a first CAN bus transceiver and a second CAN bus transceiver and through ports connected to the first CAN bus transceiver and the second CAN bus transceiver, an identifier of the CAN bus network access unit, numbers of the buses corresponding to the transceivers, and numbers of the ports connected to the buses are notified.

The foregoing process is further described below in detail.

Before step 610, the method may further include: a step of receiving a CAN control message in a scanning starting subtype sent by a detection starting CAN bus network access unit. This is a starting step for connection status detection of the CAN bus network access unit. Status notification and status detection of the entire CAN bus network access unit are started by a uniform message. In some embodiments, actions of CAN bus network access units 110 in the entire electric control network 119 are coordinated, to synchronize the status notification and the status detection (the reason is that only if one of two CAN bus network access units 110 connected to each other performs status notification and the other performs status detection, coordinated working can be performed), and in another aspect, a uniform time reference is provided to first, second, third, and fourth scanning periods mentioned below.

The detection starting CAN bus network access unit is a CAN bus network access unit 110 preset in the electric control network 119, and sends a CAN control message in a scanning starting subtype in the whole network. Therefore, after receiving the CAN control message, a CAN bus network access unit 110 in the whole network begins to set, based on time of receiving the CAN control message or a time stamp in the received CAN control message, the first, second, third, and fourth scanning periods mentioned below. The CAN bus network access unit 110 sets connection statuses between different ports and the first CAN bus 121 or the second CAN bus 122 and sends different messages in the first, second, third, and fourth scanning periods. Another CAN bus network access unit 110 connected to a port of the CAN bus network access unit 110 receives the message, and recognizes a neighboring CAN bus network access unit 110 and connection status of ports based on the messages.

The CAN control message is a message that is specified in advance (for example, specified through a protocol) and that is used for sending a global control instruction in the entire electric control network 119. This global control instruction is not limited to scanning starting, and may further perform another type of control, for example, timing control. CAN control messages used for different types of control may be differentiated by using subtypes. A CAN control message used for scanning starting of connection status detection of a CAN bus network access unit in the embodiments of the present disclosure is in a scanning starting subtype, and a CAN control message used for timing control is in a timing control subtype. A subtype may be embodied as a field of a CAN control message. After receiving a CAN control message, a CAN bus network access unit 110 views a field representing a subtype. If the field indicates a scanning starting subtype, the CAN bus network access unit 110 begins to prepare to set connection statuses between different ports and the first CAN bus 121 or the second CAN bus 122 and send different messages in the first, second, third, and fourth scanning periods mentioned below.

The detection starting CAN bus network access unit may send the CAN control message in the scanning starting subtype to all the CAN bus network access units 110 in the whole network in the following manner: The detection starting CAN bus network access unit broadcasts the CAN control message to all other detection starting CAN bus network access units in a CAN in which the detection starting CAN bus network access unit is located. After receiving the CAN control message, a routing CAN bus network access unit between the CAN and another CAN recognizes that the CAN control message is in the scanning starting subtype, and broadcasts the message to all other CAN bus network access units in the another CAN, and so on, until all CAN bus network access units in all CANs in the electric control network 119 obtain the CAN control message.

The electric control network 119 in FIG. 1 is taken as an example. It is assumed that C2 is a detection starting CAN bus network access unit. Because of being located in the first CAN 1141, C2 broadcasts a CAN control message to other CAN bus network access units 110 in the first CAN 1141, that is, C1, C3, and C4. A subtype field of the CAN control message indicates the scanning starting subtype. After receiving the CAN control message, the routing CAN bus network access unit C4 between the first CAN 1141 and the second CAN 1142 recognizes that the subtype field of the CAN control message indicates the scanning starting subtype, and broadcasts the message to all other CAN bus network access units in the second CAN 1142, that is, C5 to C8. After receiving the CAN control message, the routing CAN bus network access unit C8 between the second CAN 1142 and the third CAN 1143 recognizes that the subtype field of the CAN control message indicates the scanning starting subtype, and broadcasts the message to all other CAN bus network access units in the third CAN 1143, that is, C9 to C11. In this way, C1 to C11 all obtain the CAN control message, and therefore the subsequent first, second, third, and fourth scanning periods may be set based on time of receiving the CAN control message or a time stamp in the CAN control message, to perform the following status notification and status detection.

Although times at which the CAN bus network access units in the electric control network 119 receive the CAN control message are slightly different rather than synchronous in the foregoing process, the first, second, third, and fourth scanning periods are usually in an order of magnitude of about 5 s, and therefore differences between the times of receiving the CAN control message may be ignored compared with 5 s. Therefore, the subsequent first, second, third, and fourth scanning periods may be set based on the times of receiving the CAN control message. Additionally, a time stamp may be further set in the CAN control message. The time stamp has been added when the CAN control message is generated, and does not change with different times at which the CAN bus network access units receive the CAN control message. Therefore, if the subsequent first, second, third, and fourth scanning periods are set based on the time stamp, accuracy of setting the scanning periods can be improved better, to improve the detection effect.

Additionally, before the first scanning period, a first silent period can be set, and after the fourth scanning period, a second silent period can be set. The first silent period and the second silent period may be set to a length substantially the same as that of each of the first, second, third, and fourth scanning periods, that is, about 5 s. In the first silent period, a connection status between each port and the first CAN bus 121 or the second CAN bus 122 is the same as that in the first scanning period, and a sent message is also the same as that in the first scanning period (a connection status between each port and the first CAN bus 121 or the second CAN bus 122 and a sent message in the first scanning period are described below). In the second silent period, a connection status between each port and the first CAN bus 121 or the second CAN bus 122 is the same as that in the fourth scanning period, and a sent message is also the same as that in the fourth scanning period (a connection status between each port and the first CAN bus 121 or the second CAN bus 122 and a sent message in the fourth scanning period are described below).

Regarding a role in setting the first silent period, in some embodiments, it provides a sufficient time for some CAN bus network access units 110 to prepare, which are not ready to begin to change statuses and send messages according to a rule of changing a connection status between a port and a CAN bus in the first, second, third, and fourth scanning periods. In subsequent connection status detection, only messages received in the first, second, third, and fourth scanning periods (details are described in the following connection status detection) are considered, and the first silent period is not considered. Therefore, the first silent period plays a buffering role. In another aspect, the first silent period is set to offset differences between times at which the CAN bus network access units 110 receive the CAN control message in the scanning starting subtype. In this way, even if there is a time difference, only the length of the first silent period is affected, and the first, second, third, and fourth scanning periods can still synchronously start and end.

A role in setting the second silent period is similar to that in setting the first silent period. A status in the fourth scanning period is kept in the second silent period, therefore, the second silent period play a status buffering role. Moreover, the CAN bus network access unit 110 failing to be detected in the fourth scanning period may continue to be detected in this buffering status.

In step 610, because each CAN bus network access unit 110 has its own configuration memory which stores configuration parameters of the CAN bus network access unit 110 itself, it may be determined from these configuration parameters whether the CAN bus network access unit is a straight-line CAN bus network access unit or a transplanter CAN bus network access unit.

In step 620, for the straight-line CAN bus network access unit, the first port 131 is connected to the first CAN bus 121 and the third port 133 is connected to the second CAN bus 122 in the first scanning period, the second scanning period, the third scanning period, and the fourth scanning period that are consecutive.

Additionally, in the first silent period before the first scanning period, and in the second silent period after the fourth scanning period, the first port 131 is connected to the first CAN bus 121, and the third port 133 is connected to the second CAN bus 122 as well.

The reason for doing so is that, for the straight-line CAN bus network access unit, during actual working, only the first port 131 and the third port 133 are working, and during normal working, the first port 131 is connected to the first CAN bus 121 and the third port 133 is connected to the second CAN bus 122. In this way, as long as a connection relationship between a port and a CAN bus is set according to actual use, whether the first port 131 is connected to a counterpart or the third port 133 is connected to a counterpart can be clearly indicated to another CAN bus network access unit 110 connected to the port with the port number of the port connected to the bus in the notification message in step 640.

In step 630, for the transplanter CAN bus network access unit, the first port 131 is connected to the first CAN bus 121 and the second port, the third port, and the fourth port 132 to 134 are connected to the second CAN bus 122 in the first scanning period; the first port 131, the third port 133, and the fourth port 134 are connected to the first CAN bus 121 and the second port 132 is connected to the second CAN bus 122 in the second scanning period; the first port 131, the second port 132, and the fourth port 134 are connected to the first CAN bus 121 and the third port 133 is connected to the second CAN bus 122 in the third scanning period; and the first port, the second port, and the third port 131 to 133 are connected to the first CAN bus 121 and the fourth port 134 is connected to the second CAN bus 122 in the fourth scanning period.

Additionally, in the first silent period before the first scanning period, similar to the first scanning period, the first port 131 is connected to the first CAN bus 121, and the second port, the third port, and the fourth port 132 to 134 are connected to the second CAN bus 122. In the second silent period after the fourth scanning period, similar to the fourth scanning period, the first port, the second port, and the third port 131 to 133 are connected to the first CAN bus 121, and the fourth port 134 is connected to the second CAN bus 122.

In the first scanning period, the meaning of connecting the first port 131 to the first CAN bus 121 and connecting the second port, the third port, and the fourth port 132 to 134 to the second CAN bus 122 is that, for the transplanter CAN bus network access unit, during normal use, the first port 131 should be connected to the first CAN bus 121. The first port 131 is connected to the first CAN bus 121, and the second port, and the third port, and the fourth port 132 to 134 are connected to the second CAN bus 122. In this way, in step 640, if in the first scanning period, a bus number corresponding to the transceiver in the notification message is 1, the message is definitely sent by the first port 131, thereby clearly indicating, to another CAN bus network access unit 110 connected to the port, that the first port 131 is connected to a counterpart.

If the first port 131 being connected to the first CAN bus 121 and the second port, the third port, and the fourth port 132 to 134 being all connected to the second CAN bus 122 in the first scanning period is to clearly indicate whether the first port 131 is connected to the first CAN bus 121, the meaning of connecting the first port 131, the third port 133, and the fourth port 134 to the first CAN bus 121 and connecting the second port 132 to the second CAN bus 122 in the second scanning period is to clearly indicate whether the second port 132 is connected to the second CAN bus 122. Only the second port 132 is connected to the second CAN bus 122 in the second scanning period in this case. Therefore, if a CAN bus network access unit 110 receives a notification message in the second scanning period, where the notification message indicates that a bus number is 2, it may be clearly known that a second port 132 of another CAN bus network access unit 110 is connected to the second CAN bus.

Similarly, the first port 131, the second port 132, and the fourth port 134 being connected to the first CAN bus 121 and the third port 133 being connected to the second CAN bus 122 in the third scanning period, is to clearly indicate whether the third port 133 is connected to the second CAN bus 122. The first port, the second port, and the third port 131 to 133 being connected to the first CAN bus 121 and the fourth port 134 being connected to the second CAN bus 122 in the fourth scanning period, is to clearly indicate whether the fourth port 134 is connected to the second CAN bus 122.

In step 640, messages are sent by using the first CAN bus transceiver and the second CAN bus transceiver, and an identifier of the CAN bus network access unit, a bus number corresponding to the transceivers, and a port number of the port connected to the bus are notified through ports connected to the first CAN bus transceiver and the second CAN bus transceiver.

An identifier of a CAN bus network access unit is a unique flag allocated to the CAN bus network access unit, and can uniquely indicate "who is" the identifier of the CAN bus network access unit. In the message, this identifier is used for notifying another CAN bus network access unit 110 connected to the current CAN bus network access unit 110 of a CAN bus network access unit 110 whose port is connected to a counterpart.

The bus number corresponding to the transceiver refers to whether the transceiver is connected to the first CAN bus 121 or the second CAN bus 122. For example, the first CAN bus 121 may be represented with 1, and the second CAN bus 122 may be represented with 2.

The port number of the port connected to the bus refers to one of the first port 131, the second port 132, the third port 133, and the fourth port 134 to which the bus is connected. For example, the first port 131 may be represented with 1, the second port 132 may be represented with 2, the third port 133 may be represented with 3, and the fourth port 134 may be represented with 4.

For the straight-line CAN bus network access unit, in step 620, the first port is connected to the first CAN bus, and the third port is connected to the second CAN bus. Therefore, a message is sent by using the first CAN bus transceiver 123 and the identifier of the CAN bus network access unit, a bus number 1 (because the first CAN bus 121 is connected to the first CAN bus transceiver 123), and a port number 1 (because the first port 131 is connected to the first CAN bus 121) are notified through the first port 131 connected to the first CAN bus transceiver 123. A message is sent by using the second CAN bus transceiver 124 and the identifier of the CAN bus network access unit, a bus number 2 (because the second CAN bus 122 is connected to the second CAN bus transceiver 124), and a port number 3 (because the third port 133 is connected to the second CAN bus 122) are notified through the third port 133 connected to the second CAN bus transceiver 124.

For the transplanter CAN bus network access unit, in step 630, in the first scanning period, the second scanning period, the third scanning period, and the fourth scanning period, connection relationships between ports and the first CAN bus 121 or the second CAN bus 122 are all set in different manners. In this case, it is relatively difficult to notify a port number in a message, and therefore only a bus number, that is, whether the first CAN bus 121 or the second CAN bus 122 corresponding to the CAN bus transceiver may be notified in the message. Then, the CAN bus network access unit 110 receiving the message sends a port query request to the current CAN bus network access unit 110, and the current CAN bus network access unit 110 responds to this request, indicating a port number of a port connected to the bus. In this way, if the first CAN bus transceiver 123 sends a message, the message contains an identifier of the CAN bus network access unit, a bus number 1, and a particular flag bit, where the bus number 1 indicates that the first CAN bus transceiver 123 corresponds to the first CAN bus 121, and the particular flag bit indicates that the transplanter CAN bus network access unit sends a message (for example, 0). If the second CAN bus transceiver 124 sends a message, the message contains an identifier of the CAN bus network access unit, a bus number 2, and a particular flag bit, where the bus number 2 indicates that the second CAN bus transceiver 124 corresponds to the second CAN bus 122.

Figure 7:
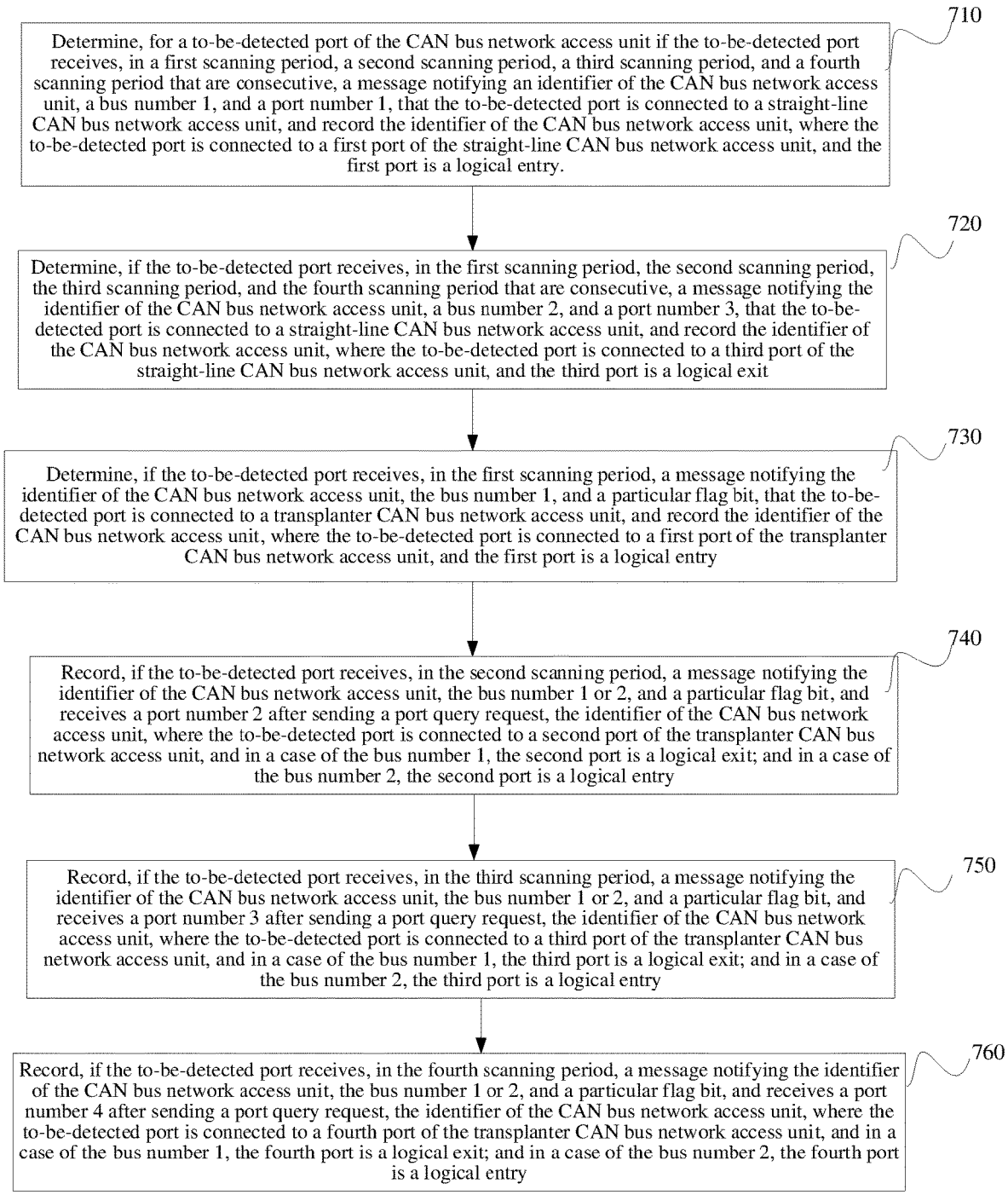
FIG. 7 is a flowchart of a connection status detection method for a CAN bus network, according to some embodiments of the present disclosure.

As shown in FIG. 7, a connection status detection method for a CAN bus network access unit according to some embodiments of the present disclosure includes steps 710 to 760.

At step 710, for a to-be-detected port of the CAN bus network access unit, if the to-be-detected port receives, in a first scanning period, a second scanning period, a third scanning period, and a fourth scanning period that are consecutive, a message notifying an identifier of the CAN bus network access unit, a bus number 1, and a port number 1, the to-be-detected port is determined to be connected to a straight-line CAN bus network access unit, and the identifier of the CAN bus network access unit is recorded. The to-be-detected port is connected to a first port of the straight-line CAN bus network access unit, and the first port is a logical entry.

At step 720, if the to-be-detected port receives, in the first scanning period, the second scanning period, the third scanning period, and the fourth scanning period that are consecutive, a message notifying the identifier of the CAN bus network access unit, a bus number 2, and a port number 3, the to-be-detected port is determined to be connected to a straight-line CAN bus network access unit, and the identifier of the CAN bus network access unit is recorded. The to-be-detected port is connected to a third port of the straight-line CAN bus network access unit, and the third port is a logical exit.

At step 730, if the to-be-detected port receives, in the first scanning period, a message notifying the identifier of the CAN bus network access unit, the bus number 1, and a particular flag bit, the to-be-detected port is determined to be connected to a transplanter CAN bus network access unit, and the identifier of the CAN bus network access unit is recorded. The to-be-detected port is connected to a first port of the transplanter CAN bus network access unit, and the first port is a logical entry.

At step 740, if the to-be-detected port receives, in the second scanning period, a message notifying the identifier of the CAN bus network access unit, the bus number 1 or 2, and a particular flag bit, and receives a port number 2 after sending a port query request, the identifier of the CAN bus network access unit is recorded. The to-be-detected port is connected to a second port of the transplanter CAN bus network access unit, and in a case of the bus number 1, the second port is a logical exit; and in a case of the bus number 2, the second port is a logical entry.

At step 750, if the to-be-detected port receives, in the third scanning period, a message notifying the identifier of the CAN bus network access unit, the bus number 1 or 2, and a particular flag bit, and receives a port number 3 after sending a port query request, the identifier of the CAN bus network access unit is recorded. The to-be-detected port is connected to a third port of the transplanter CAN bus network access unit, and in a case of the bus number 1, the third port is a logical exit; and in a case of the bus number 2, the third port is a logical entry.

At step 760, if the to-be-detected port receives, in the fourth scanning period, a message notifying the identifier of the CAN bus network access unit, the bus number 1 or 2, and a particular flag bit, and receives a port number 4 after sending a port query request, the identifier of the CAN bus network access unit is recorded. The to-be-detected port is connected to a fourth port of the transplanter CAN bus network access unit, and in a case of the bus number 1, the fourth port is a logical exit; and in a case of the bus number 2, the fourth port is a logical entry.

In the status notification method described above in the embodiments of the present disclosure, for the straight-line CAN bus network access unit, the message notified by the CAN bus network access unit has the identifier of the CAN bus network access unit, the bus number 1 or 2 corresponding to the transceiver, and the port number 1 or 2 the bus connected to, but has no particular flag bit (for example, 0). For the transplanter CAN bus network access unit, the message notified has the identifier of the CAN bus network access unit, the bus number 1 or 2 corresponding to the transceiver, and the particular flag bit. Therefore, whether the to-be-detected port is connected to a straight-line CAN bus network access unit or a transplanter CAN bus network access unit can be determined according to whether there is the particular flag bit in the message.

If there is no particular flag bit, the to-be-detected port is connected to a straight-line CAN bus network access unit, and in steps 710 and 720, which port of the straight-line CAN bus network access unit is connected and whether the port is a logical entry or a logical exit can be further determined. Specifically, if a message including an identifier of the straight-line CAN bus network access unit, the bus number 1, and the port number 1 is received, the first port 131 of the straight-line CAN bus network access unit can be determined to be connected according to the port number 1. Because of being connected to the first CAN bus 121, the first port 131 plays a role of a logical entry, and is a logical entry. Because the to-be-detected port is connected to the logical entry of the straight-line CAN bus network access unit, the to-be-detected port itself should be a logical exit of the current CAN bus network access unit. Specifically, if a message including an identifier of the straight-line CAN bus network access unit, the bus number 2, and the port number 3 is received, the third port 133 of the straight-line CAN bus network access unit is determined to be connected according to the port number 3. Because of being connected to the second CAN bus 122, the third port 133 plays a role of a logical exit, and is a logical exit. Because the to-be-detected port is connected to the logical exit of the straight-line CAN bus network access unit, the to-be-detected port itself should be a logical entry of the current CAN bus network access unit.

Connection statuses between a port and a CAN bus for the straight-line CAN bus network access unit in the first scanning period, the second scanning period, the third scanning period, and the fourth scanning period are all the same. Therefore, the foregoing process may be performed at any time in the first scanning period, the second scanning period, the third scanning period, and the fourth scanning period. However, in some embodiments, it may be specified that the foregoing process is performed only in the first scanning period, or specified that the foregoing process is performed in any other scanning period.

If there is a particular flag bit, the to-be-detected port is connected to a transplanter CAN bus network access unit, and in steps 730 to 760, which port of the transplanter CAN bus network access unit is connected and whether the port is a logical entry or a logical exit may be determined with reference to the four scanning periods respectively. As described above, in the first scanning period, the first port 131 is connected to the first CAN bus 121, and the second port, the third port, and the fourth port 132 to 134 are connected to the second CAN bus 122. The connection of the first port 131 being set different from other ports is mainly to indicate whether the first port 131 is connected and whether the first port 131 plays a role of a logical entry or exit. In the second scanning period, the first port 131, the third port 133, and the fourth port 134 are connected to the first CAN bus 121, and the second port 132 is connected to the second CAN bus 122. The connection of the second port 132 being set different from other ports is mainly to indicate whether the second port 132 is connected and whether the second port 132 plays a role of a logical entry or exit. In the third scanning period, the first port 131, the second port 132, and the fourth port 134 being connected to the first CAN bus 121, and the third port 133 being connected to the second CAN bus 122 is mainly to indicate whether the third port 133 is connected and whether the third port 133 plays a role of a logical entry or exit. In the fourth scanning period, the first port, the second port, and the third port 131 to 133 being connected to the first CAN bus 121, and the fourth port 134 being connected to the second CAN bus 122 is mainly to indicate whether the fourth port 134 is connected and whether the fourth port 134 plays a role of a logical entry or exit. Therefore, whether the first port 131, the second port 132, the third port 133, and the fourth port 134 are connected, and logical properties of these ports are respectively determined in the first, second, third, and fourth scanning periods.

In step 730, whether the to-be-detected port is connected to the first port 131 of the transplanter CAN bus network access unit is mainly determined. If the to-be-detected port receives, in the first scanning period, a message notifying the identifier of the CAN bus network access unit, the bus number 1, and the particular flag bit, because the first CAN bus 121 is fixedly connected to the first port 131, it can be directly determined without sending a query request that the to-be-detected port is connected to the first port 131 of the straight-line CAN bus network access unit. Moreover, because of being connected to the first CAN bus 121, the first port 131 plays a role of a logical entry, and is a logical entry. Because the to-be-detected port is connected to the logical entry of the transplanter CAN bus network access unit, the to-be-detected port itself should be a logical exit of the current CAN bus network access unit.

In step 740, whether the to-be-detected port is connected to the second port 132 of the transplanter CAN bus network access unit is mainly determined. If the to-be-detected port receives, in the second scanning period, a message notifying the identifier of the CAN bus network access unit, the bus number 1 or 2, and a particular flag bit, and receives a port number 2 after sending a port query request, it may be determined that the to-be-detected port is connected to a second port 132 of the transplanter CAN bus network access unit. In a case of the bus number 1, the second port 132 is connected to the first CAN bus 121, indicating that the second port is a logical exit, and the to-be-detected port itself should be a logical entry of the current CAN bus network access unit. In a case of the bus number 2, the second port is a logical entry, and the to-be-detected port itself should be a logical exit of the current CAN bus network access unit.

In step 750, whether the to-be-detected port is connected to the third port 133 of the transplanter CAN bus network access unit is mainly determined. If the to-be-detected port receives, in the third scanning period, a message notifying the identifier of the CAN bus network access unit, the bus number 1 or 2, and a particular flag bit, and receives a port number 3 after sending a port query request, it may be determined that the to-be-detected port is connected to a third port 133 of the transplanter CAN bus network access unit. In a case of the bus number 1, the third port 133 is connected to the first CAN bus 121, indicating that the third port is a logical exit, and the to-be-detected port itself should be a logical entry of the current CAN bus network access unit. In a case of the bus number 2, the third port is a logical entry, and the to-be-detected port itself should be a logical exit of the current CAN bus network access unit.

In step 760, whether the to-be-detected port is connected to the fourth port 134 of the transplanter CAN bus network access unit is mainly determined. If the to-be-detected port receives, in the fourth scanning period, a message notifying the identifier of the CAN bus network access unit, the bus number 1 or 2, and a particular flag bit, and receives a port number 4 after sending a port query request, it may be determined that the to-be-detected port is connected to a fourth port 134 of the transplanter CAN bus network access unit. In a case of the bus number 1, the fourth port 134 is connected to the first CAN bus 121, indicating that the fourth port is a logical exit, and the to-be-detected port itself should be a logical entry of the current CAN bus network access unit. In a case of the bus number 2, the fourth port is a logical entry, and the to-be-detected port itself should be a logical exit of the current CAN bus network access unit.

The process of performing connection status detection for a to-be-detected port of a CAN bus network access unit 110 is described above. After connection status detection is performed on each to-be-detected port of the CAN bus network access unit 110, identifiers of CAN bus network access unit 110 connected to each to-be-detected port, port numbers of the connected CAN bus network access unit 110, logical types of the connected ports, and logical properties of the to-be-detected ports may be recorded.

For example, a record result for a straight-line CAN bus network access unit C2 is as follows:

TABLE 1

| Port Number of a to-be-detected port | Identifier of a connected CAN bus network access unit | Port number of the connected CAN bus network access unit | Logical property of a port of the connected CAN bus network access unit | Logical property of the to-be-detected port itself |
|---|---|---|---|---|
| 1 (first port) | C1 | 3 | Logical exit | Logical entry |
| 2 (second port) | — | — | — | — |
| 3 (third port) | C3 | 1 | Logical entry | Logical exit |
| 4 (fourth port) | — | — | — | — |

A record result for a transplanter CAN bus network access unit C2 is as follows:

TABLE 2

| Port Number of a to-be-detected port | Identifier of a connected CAN bus network access unit | Port number of the connected CAN bus network access unit | Logical property of a port of the connected CAN bus network access unit | Logical property of the to-be-detected port itself |
|---|---|---|---|---|
| 1 (first port) | C1 | 3 | Logical exit | Logical entry |
| 2 (second port) | C3 | 1 | Logical entry | Logical exit |
| 3 (third port) | C4 | 1 | Logical entry | Logical exit |
| 4 (fourth port) | C5 | 1 | Logical entry | Logical exit |

As shown in Table 1 and Table 2, for each CAN bus network access unit 110 in the electric control network, after recorded identifiers of a CAN bus network access unit 110 connected to each to-be-detected port thereof, port numbers of the connected CAN bus network access unit 110, and whether the connected port is a logical entry or logical exit are recorded, a diagram of a port connection relationship between CAN bus network access units 110 in the electric control network may be automatically machine-generated.

Through the foregoing solution, in the mode of dual CAN networks, a port connection status between a straight-line CAN bus network access unit and a transplanter CAN bus network access unit can be intelligently found and completely found by a device through automatic scanning. Manual setting does not need to be performed during engineering operation and maintenance, and the on-site implementation costs (device debugging time and personnel costs) is greatly reduced. Therefore, this solution is simple and convenient, without error, and has an industry-leading advantage.

Figure 8:
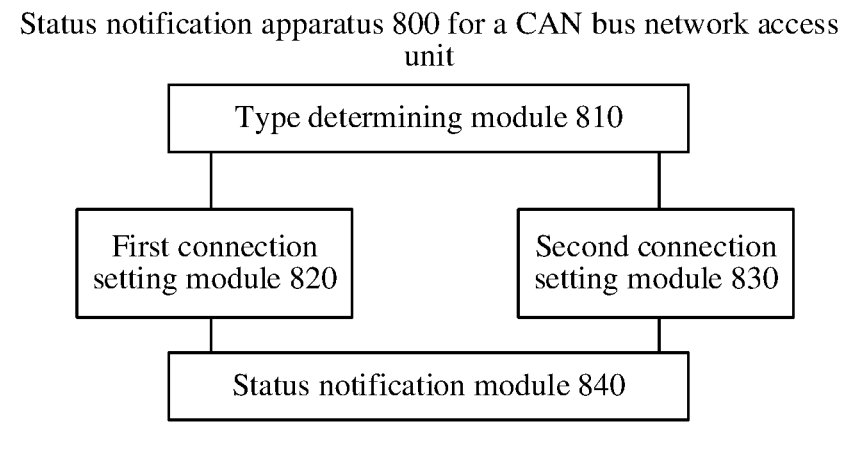
FIG. 8 is a block diagram illustrating a status notification apparatus for a CAN bus network access unit, according to some embodiments of the present disclosure.

As shown in FIG. 8, according to some embodiments of the present disclosure, a status notification apparatus 800 for a CAN bus network access unit 110 is provided. The CAN bus network access unit 110 includes: a first CAN bus 121 and a second CAN bus 122; a first CAN bus transceiver 123 and a second CAN bus transceiver 124, respectively connected to the first CAN bus 121 and the second CAN bus 122 and respectively configured to communicate with a first CAN bus 121 and a second CAN bus 122 in another CAN bus network access unit 110; a first port 131, connected to the first CAN bus 121; and a second port, a third port, and a fourth port 132 to 134; the CAN bus network access unit 110 is classified into a straight-line CAN bus network access unit and a transplanter CAN bus network access unit, where the third port 133 of the straight-line CAN bus network access unit is connected to the second CAN bus 122, and any one of the second port 132 and the fourth port 134 is connected to neither the first CAN bus 121 nor the second CAN bus 122; and any one of the second port 132, the third port 133, and the fourth port 134 of the transplanter CAN bus network access unit is connectable to the first CAN bus 121 or the second CAN bus 122. The status notification apparatus 800 includes:
- a type determining module 810, configured to determine whether the CAN bus network access unit 110 is the straight-line CAN bus network access unit or the transplanter CAN bus network access unit;
- a first connection setting module 820, configured to connect, if the CAN bus network access unit 110 is the straight-line CAN bus network access unit, the first port 131 to the first CAN bus 121 and the third port 133 to the second CAN bus 122 in a first scanning period, a second scanning period, a third scanning period, and a fourth scanning period that are consecutive;
- a second connection setting module 830, configured to connect, if the CAN bus network access unit 110 is the transplanter CAN bus network access unit, the first port 131 to the first CAN bus 121 and the second port, the third port, and the fourth port 132 to 134 to the second CAN bus 122 in the first scanning period; connect the first port 131, the third port 133, and the fourth port 134 to the first CAN bus 121 and the second port 132 to the second CAN bus 122 in the second scanning period; connect the first port 131, the second port 132, and the fourth port 134 to the first CAN bus 121 and the third port 133 to the second CAN bus 122 in the third scanning period; and connect the first port, the second port, and the third port 131 to 133 to the first CAN bus 121 and the fourth port 134 to the second CAN bus 122 in the fourth scanning period; and
- a status notification module 840, configured to send messages by using the first CAN bus transceiver 123 and the second CAN bus transceiver 124 and notify, through ports connected to the first CAN bus transceiver 123 and the second CAN bus transceiver 124, an identifier of the CAN bus network access unit 110, bus numbers corresponding to the transceivers, and port numbers of the ports connected to the buses.

Specific implementation of the modules in the status notification apparatus 800 has been described in the detailed description of the flowchart of the method with reference to FIG. 6, and therefore is not described in detail.

Figure 9:
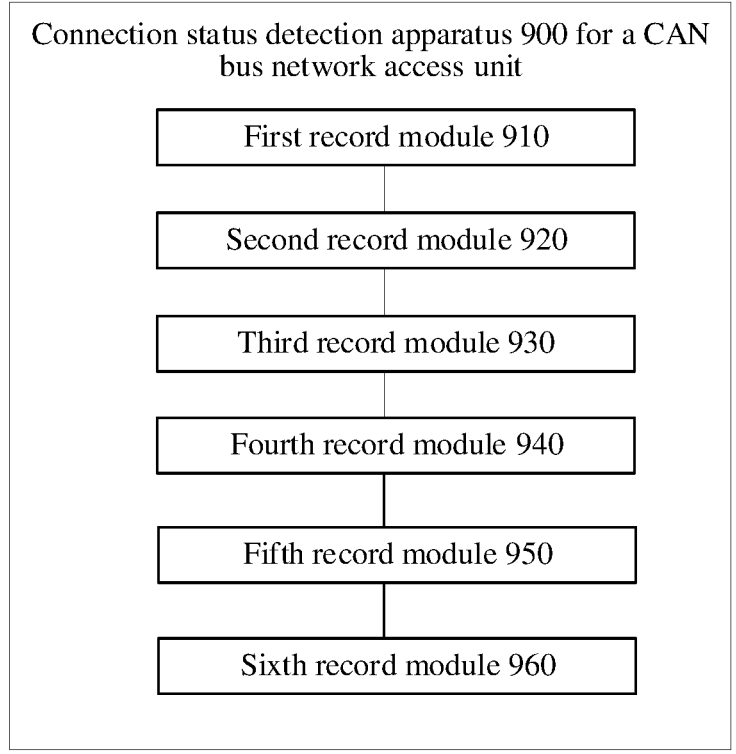
FIG. 9 is a block diagram illustrating a connection status detection apparatus for a CAN bus network access unit, according to some embodiments of the present disclosure.

As shown in FIG. 9, according to some embodiments of the present disclosure, a connection status detection apparatus 900 for a CAN bus network access unit 110 is provided. The CAN bus network access unit 110 includes: a first CAN bus 121; a second CAN bus 122; a first CAN bus transceiver 123 and a second CAN bus transceiver 124, respectively connected to the first CAN bus 121 and the second CAN bus 122 and respectively configured to communicate with a first CAN bus 121 and a second CAN bus 122 in another CAN bus network access unit 110; a first port 131, connected to the first CAN bus 121; and a second port, a third port, and a fourth port 132 to 134; the CAN bus network access unit 110 is classified into a straight-line CAN bus network access unit and a transplanter CAN bus network access unit, where the third port 133 of the straight-line CAN bus network access unit is connected to the second CAN bus 122, and any one of the second port 132 and the fourth port 134 is connected to neither the first CAN bus 121 nor the second CAN bus 122; and any one of the second port, the third port, and the fourth port 132 to 134 of the transplanter CAN bus network access unit is connectable to the first CAN bus 121 or the second CAN bus 122. The connection status detection apparatus 900 includes:
- a first record module 910, configured to determine, for a to-be-detected port of the CAN bus network access unit, if the to-be-detected port receives, in a first scanning period, a second scanning period, a third scanning period, and a fourth scanning period that are consecutive, a message notifying the CAN bus network access unit, a bus number 1, and a port number 1, that the to-be-detected port is connected to a straight-line CAN bus network access unit, and record the identifier of the CAN bus network access unit, where the to-be-detected port is connected to a first port of the straight-line CAN bus network access unit, and the first port is a logical entry;
- a second record module 920, configured to determine, if the to-be-detected port receives, in the first scanning period, the second scanning period, the third scanning period, and the fourth scanning period that are consecutive, a message notifying the identifier of the CAN bus network access unit, a bus number 2, and a port number 3, that the to-be-detected port is connected to a straight-line CAN bus network access unit, and record the identifier of the CAN bus network access unit, where the to-be-detected port is connected to a third port of the straight-line CAN bus network access unit, and the third port is a logical exit;
- a third record module 930, configured to determine, if the to-be-detected port receives, in the first scanning period, a message notifying the CAN bus network access unit, the bus number 1, and a particular flag bit, that the to-be-detected port is connected to a transplanter CAN bus network access unit, and record the identifier of the CAN bus network access unit, where the to-be-detected port is connected to a first port of the transplanter CAN bus network access unit, and the first port is a logical entry;
- a fourth record module 940, configured to record, if the to-be-detected port receives, in the second scanning period, a message notifying the CAN bus network access unit, the bus number 1 or 2, and a particular flag bit, and receives a port number 2 after sending a port query request, the identifier of the CAN bus network access unit, where the to-be-detected port is connected to a second port of the transplanter CAN bus network access unit, and in a case of the bus number 1, the second port is a logical exit; and in a case of the bus number 2, the second port is a logical entry;

a fifth record module 950, configured to record, if the to-be-detected port receives, in the third scanning period, a message notifying the identifier of the CAN bus network access unit, the bus number 1 or 2, and a particular flag bit, and receives a port number 3 after sending a port query request, the identifier of the CAN bus network access unit, where the to-be-detected port is connected to a third port of the transplanter CAN bus network access unit, and in a case of the bus number 1, the third port is a logical exit; and in a case of the bus number 2, the third port is a logical entry; and a sixth record module 960, configured to record, if the to-be-detected port receives, in the fourth scanning period, a message notifying the identifier of the CAN bus network access unit, the bus number 1 or 2, and a particular flag bit, and receives a port number 4 after sending a port query request, the identifier of the CAN bus network access unit, where the to-be-detected port is connected to a fourth port of the transplanter CAN bus network access unit, and in a case of the bus number 1, the fourth port is a logical exit; and in a case of the bus number 2, the fourth port is a logical entry.

Specific implementation of the modules in the connection status detection apparatus 900 has been described in the detailed description of the flowchart of the method with reference to FIG. 7, and therefore is not described in detail.

Figure 10:
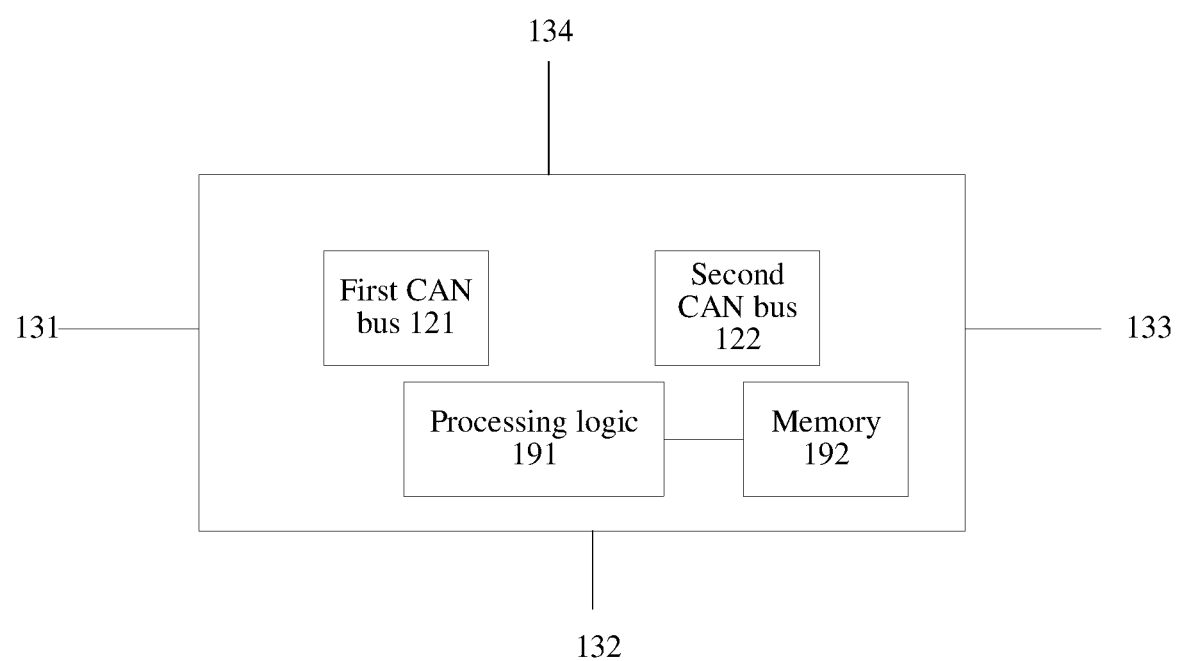
FIG. 10 is a specific structural diagram of a CAN bus network access unit, according to some embodiments of the present disclosure.

FIG. 10 is a specific structural diagram of a CAN bus network access unit 110 according to some embodiments of the present disclosure. Compared with FIG. 2B, FIG. 10 further illustrates control parts of the CAN bus network access unit 110 that are configured to perform the status notification method shown in FIG. 6 and the connection status detection method shown in FIG. 7, that is, a memory 192 and a processing logic 191. The processing logic 191 may be a processor, and may alternatively be a logical circuit configured to perform processing. The memory 192 is configured to store control instructions. The processing logic 191 is connected to the memory 192, and configured to read the control instructions stored in the memory 192, to perform the status notification method shown in FIG. 6 and the connection status detection method shown in FIG. 7.

It can be understood that, the embodiments of this specification are all described in a progressive manner, for same or similar parts in the embodiments, refer to these embodiments, and descriptions of each embodiment focus on a difference from other embodiments. Especially, an apparatus embodiment is basically similar to a method described in a method embodiment, and therefore is described briefly. For related parts, reference is made to partial descriptions in other embodiments.

It should be understood that specific embodiments of this specification are described above. Other embodiments are within the scope of the claims. In some embodiments, the actions or steps in the claims may be performed in sequences different from those in the embodiments and expected results may still be achieved. In addition, the processes depicted in the accompanying drawings do not necessarily require an automotive particular order or a sequential order for implementing the expected results. In some embodiments, multitasking and parallel processing are also possible or may be advantageous.

It should be understood that an element described in a singular form herein or displayed only one in the accompanying drawings does not represent that the element is limited to one. In addition, modules or elements described or shown as separate herein may be combined into a single module or element, and a module or an element described or shown herein as a single module or element may be split into a plurality of modules or elements.

It should also be understood that the terms and expression manners used herein are merely for description, and one or more embodiments of this specification should not be limited to these terms and expressions. The use of these terms and expressions does not mean to exclude any equivalent features of the illustration and description (or part of them), and it should be understood that various modifications that may exist should also be included in the scope of claims. Other modifications, changes, and replacements may also exist. Accordingly, the claims should be considered as covering all these equivalents.

What is claimed is:

1. A controller area network (CAN) bus network access unit, comprising:
   a first CAN bus;
   a second CAN bus;
   a first CAN bus transceiver;
   a second CAN bus transceiver, wherein
   the first CAN bus transceiver and the second CAN bus transceiver are respectively communicatively coupled to the first CAN bus and the second CAN bus and are respectively configured to communicate with another first CAN bus and another second CAN bus in another CAN bus network access unit;
   a first port, communicatively coupled to the first CAN bus; and
   a plurality of variable connection ports, wherein at least one of the plurality of variable connection ports is communicatively coupled to one of the first CAN bus and the second CAN bus, or communicatively coupled to neither the first CAN bus nor the second CAN bus.

2. The CAN bus network access unit according to claim 1, wherein the plurality of variable connection ports comprise a second port, a third port, and a fourth port.

3. The CAN bus network access unit according to claim 2, wherein the third port is communicatively coupled to the second CAN bus, and any one of the second port and the fourth port is communicatively coupled to neither the first CAN bus nor the second CAN bus.

4. The CAN bus network access unit according to claim 2, wherein the CAN bus network access unit is a CAN bus network access unit located in only one CAN, and none of the second port, the third port, and the fourth port is communicatively coupled to the second CAN bus.

5. The CAN bus network access unit according to claim 2, wherein the CAN bus network access unit is a CAN bus network access unit not only located in one CAN, but also located in another CAN, and at least one of the second port, the third port, and the fourth port is communicatively coupled to the second CAN bus.

6. The CAN bus network access unit according to claim 1, wherein the CAN bus network access unit is a CAN bus network access unit of an electric control network in a logistics conveying line, and at least one of the first port and the plurality of variable connection ports is communicatively coupled to a control component configured to control logistics conveying in the logistics conveying line.

7. The CAN bus network access unit according to claim 1, wherein the CAN bus network access unit is a CAN bus network access unit of an electric control network in a product production line, and at least one of the first port and the plurality of variable connection ports is communicatively coupled to a control component configured to control product production in the product production line.

8. The CAN bus network access unit according to claim 1, wherein the CAN bus network access unit is a CAN bus network access unit of an Internet of Things, and at least one of the first port and the plurality of variable connection ports is communicatively coupled to an Internet of Things device accessing the Internet of Things.

9. An electric control network, comprising a first controller area network (CAN) and a second CAN, wherein the first CAN and the second CAN has a common routing CAN bus network access unit, and at least one of the first CAN and the second CAN further has an internal CAN bus network access unit in addition to the routing CAN bus network access unit, wherein
each of the routing CAN bus network access unit and the internal CAN bus network access unit comprises a first CAN bus, a second CAN bus, a first port, a second port, a third port, and a fourth port,
wherein:
in the internal CAN bus network access unit, the first port is communicatively coupled to the first CAN bus, and none of the second port, the third port, and the fourth port is communicatively coupled to the second CAN bus; and
in the routing CAN bus network access unit, the first port is communicatively coupled to the first CAN bus, and at least one of the second port, the third port, and the fourth port is communicatively coupled to the second CAN bus.

10. The electric control network according to claim 9, wherein the routing CAN bus network access unit or the internal CAN bus network access unit further comprises: a first CAN bus transceiver and a second CAN bus transceiver, respectively communicatively coupled to the first CAN bus and the second CAN bus and respectively configured to communicate with another first CAN bus and another second CAN bus in another CAN bus network access unit.

11. The electric control network according to claim 10, wherein the internal CAN bus network access unit of the first CAN comprises a message sending CAN bus network access unit and a message receiving CAN bus network access unit, wherein
the first CAN bus transceiver of the message sending CAN bus network access unit is configured to broadcast a directing message to another CAN bus network access unit in the first CAN, and the directing message contains an identifier of the message receiving CAN bus network access unit;
the message receiving CAN bus network access unit is configured to, after receiving the directing message, determine that the identifier of the message receiving CAN bus network access unit contained in the directing message matches its own identifier, and to reserve the directing message; and
another internal CAN bus network access unit other than the message receiving CAN bus network access unit is configured to, after receiving the directing message, determine that the identifier of the message receiving CAN bus network access unit contained in the directing message does not match its own identifier, and to discard the directing message; and
the routing CAN bus network access unit is configured to, after receiving the directing message, determine that the identifier of the message receiving CAN bus network access unit contained in the directing message is in a first CAN bus network access unit identifier list, and to discard the directing message.

12. The electric control network according to claim 10, wherein the internal CAN bus network access unit of the first CAN comprises a message sending CAN bus network access unit, and the internal CAN bus network access unit of the second CAN comprises a message receiving CAN bus network access unit, wherein
the first CAN bus transceiver of the message sending CAN bus network access unit is configured to broadcast a directing message to another CAN bus network access unit in the first CAN, and the directing message contains an identifier of the message receiving CAN bus network access unit;
another internal CAN bus network access unit is configured to, after receiving the directing message, determine that the identifier of the message receiving CAN bus network access unit contained in the directing message does not match its own identifier, and to discard the directing message;
the routing CAN bus network access unit is configured to, after receiving the directing message, determine that the identifier of the message receiving CAN bus network access unit contained in the directing message is not in a first CAN bus network access unit identifier list, and to broadcast the directing message to the internal CAN bus network access unit in the second CAN through the second CAN bus transceiver; and
the message receiving CAN bus network access unit in the second CAN is configured to, after receiving the directing message, determine that the identifier of the message receiving CAN bus network access unit contained in the directing message matches its own identifier, and to reserve the directing message; and another internal CAN bus network access unit other than the message receiving CAN bus network access unit in the second CAN is configured to, after receiving the directing message, determine that the identifier of the message receiving CAN bus network access unit contained in the directing message does not match its own identifier, and to discard the directing message.

13. The electric control network according to claim 9, wherein the electric control network is an electric control network in a logistics conveying line, and at least one of the first port and the plurality of variable connection ports is communicatively coupled to a control component configured to control logistics conveying in the logistics conveying line.

14. The electric control network according to claim 9, wherein the electric control network is an electric control network in a product production line, and at least one of the first port and the plurality of variable connection ports is communicatively coupled to a control component configured to control product production in the product production line.

15. The electric control network according to claim 9, wherein the electric control network is an Internet of Things, and at least one of the first port and the plurality of variable connection ports is communicatively coupled to an Internet of Things device accessing the Internet of Things.

16. A status notification method for a controller area network (CAN) bus network access unit, wherein the CAN bus network access unit comprises: a first CAN bus and a second CAN bus; a first CAN bus transceiver and a second CAN bus transceiver, respectively communicatively coupled to the first CAN bus and the second CAN bus and respectively configured to communicate with another first CAN bus and another second CAN bus in another CAN bus network access unit; a first port, communicatively coupled to the first CAN bus; and a second port, a third port, and a fourth port;
- the CAN bus network access unit is classified into a straight-line CAN bus network access unit and a transplanter CAN bus network access unit, wherein the third port of the straight-line CAN bus network access unit is communicatively coupled to the second CAN bus, and any one of the second port and the fourth port is communicatively coupled to neither the first CAN bus nor the second CAN bus; and any one of the second port, the third port, and the fourth port of the transplanter CAN bus network access unit is connectable to the first CAN bus or the second CAN bus; and
- the method comprises:
- determining whether the CAN bus network access unit is the straight-line CAN bus network access unit or the transplanter CAN bus network access unit;
    - if the CAN bus network access unit is the straight-line CAN bus network access unit, connecting the first port to the first CAN bus and the third port to the second CAN bus in a first scanning period, a second scanning period, a third scanning period, and a fourth scanning period that are consecutive; or
    - if the CAN bus network access unit is the transplanter CAN bus network access unit:
        - connecting, the first port to the first CAN bus and the second port, the third port, and the fourth port to the second CAN bus in the first scanning period;
        - connecting the first port, the third port, and the fourth port to the first CAN bus and the second port to the second CAN bus in the second scanning period;
        - connecting the first port, the second port, and the fourth port to the first CAN bus and the third port to the second CAN bus in the third scanning period; and
        - connecting the first port, the second port, and the third port to the first CAN bus and the fourth port to the second CAN bus in the fourth scanning period; and
- sending messages by using the first CAN bus transceiver and the second CAN bus transceiver and notifying, through ports communicatively coupled to the first CAN bus transceiver and the second CAN bus transceiver, an identifier of the CAN bus network access unit, a bus number corresponding to the transceivers, and a port number of a port communicatively coupled to the bus.

17. The method according to claim 16, wherein before the connecting the first port to the first CAN bus and connecting the third port to the second CAN bus in the first scanning period, the second scanning period, the third scanning period, and the fourth scanning period that are consecutive, the method further comprises: connecting the first port to the first CAN bus and connecting the third port to the second CAN bus in a first silent period before the first scanning period; and
- after the connecting the first port to the first CAN bus and connecting the third port to the second CAN bus in the first scanning period, the second scanning period, the third scanning period, and the fourth scanning period that are consecutive, the method further comprises: connecting the first port to the first CAN bus and connecting the third port to the second CAN bus in a second silent period before the fourth scanning period.

18. The method according to claim 16, wherein before the connecting the first port to the first CAN bus and connecting the second port, the third port, and the fourth port to the second CAN bus in the first scanning period, the method further comprises: connecting the first port to the first CAN bus and connecting the second port, the third port, and the fourth port to the second CAN bus in a first silent period before the first scanning period; and
- after the connecting the first port, the second port, and the third port to the first CAN bus and connecting the fourth port to the second CAN bus in the fourth scanning period, the method further comprises: connecting the first port, the second port, and the third port to the first CAN bus and connecting the fourth port to the second CAN bus in a second silent period after the fourth scanning period.

19. The method according to claim 16, wherein before the determining whether the CAN bus network access unit is the straight-line CAN bus network access unit or the transplanter CAN bus network access unit, the method further comprises:
- receiving a CAN control message in a scanning starting subtype sent by a detection starting CAN bus network access unit.

20. The method according to claim 16, wherein the sending messages by using the first CAN bus transceiver and the second CAN bus transceiver and notifying, through ports communicatively coupled to the first CAN bus transceiver and the second CAN bus transceiver, the identifier of the CAN bus network access unit, the bus number corresponding to the transceivers, and the port number of the port communicatively coupled to the bus comprises:
- for the straight-line CAN bus network access unit:
    - sending a message by using the first CAN bus transceiver and notifying, through the first port communicatively coupled to the first CAN bus transceiver, the identifier of the CAN bus network access unit, a bus number 1, and a port number 1; and
    - sending a message by using the second CAN bus transceiver and notifying, through the third port communicatively coupled to the second CAN bus transceiver, the identifier of the CAN bus network access unit, a bus number 2, and a port number 3; and
- for the transplanter CAN bus network access unit:
    - sending a message by using the first CAN bus transceiver, notifying, through a port communicatively coupled to the first CAN bus transceiver, the identifier of the CAN bus network access unit, a bus number 1, and a particular flag bit, and responding, in response to receiving a port query request, with a port number of the port communicatively coupled to the first CAN bus; and
    - sending a message by using the second CAN bus transceiver, notifying, through a port communicatively coupled to the second CAN bus transceiver, the identifier of the CAN bus network access unit, a bus number 2, and a particular flag bit, and responding, in response to receiving a port query request, with a port number of the port communicatively coupled to the second CAN bus.

\* \* \* \* \*